US011425593B2

United States Patent
Zhou et al.

(10) Patent No.: US 11,425,593 B2
(45) Date of Patent: Aug. 23, 2022

(54) METHOD FOR IMPLEMENTING TRAFFIC SPLITTING

(71) Applicant: ZTE CORPORATION, Guangdong (CN)

(72) Inventors: Xiaoyun Zhou, Guangdong (CN); Jinguo Zhu, Guangdong (CN); Shuang Liang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 281 days.

(21) Appl. No.: 16/322,011

(22) PCT Filed: Mar. 15, 2018

(86) PCT No.: PCT/CN2018/079108
§ 371 (c)(1),
(2) Date: Jan. 30, 2019

(87) PCT Pub. No.: WO2018/145669
PCT Pub. Date: Aug. 16, 2018

(65) Prior Publication Data
US 2021/0289390 A1  Sep. 16, 2021

(30) Foreign Application Priority Data

Feb. 10, 2017 (CN) .......................... 201710073596.1
May 7, 2017 (CN) .......................... 201710314857.4

(51) Int. Cl.
*H04W 28/02* (2009.01)
*H04W 28/08* (2009.01)
(Continued)

(52) U.S. Cl.
CPC ......... *H04W 28/0263* (2013.01); *H04L 47/20* (2013.01); *H04L 47/2441* (2013.01); *H04W 28/0933* (2020.05); *H04W 28/14* (2013.01)

(58) Field of Classification Search
CPC ............. H04W 28/0263; H04W 28/14; H04W 28/0933; H04L 47/2441; H04L 47/20
(Continued)

(56) References Cited

U.S. PATENT DOCUMENTS

2011/0122885 A1    5/2011  Hedman
2013/0170348 A1*   7/2013  Luna .................... H04W 28/02
                                                        370/230.1
(Continued)

FOREIGN PATENT DOCUMENTS

CN      102598633 A      7/2012
CN      104010332 A      8/2014
(Continued)

OTHER PUBLICATIONS

International Search Report dated May 30, 2018 for International Application No. PCT/CN2018/079108, 5 pages.
(Continued)

*Primary Examiner* — Kibrom T Hailu
*Assistant Examiner* — Nizam U Ahmed
(74) *Attorney, Agent, or Firm* — Knobbe, Martens, Olson & Bear, LLP

(57) ABSTRACT

Disclosed are a method and apparatus for implementing traffic splitting. The method includes: after a control plane function obtains an application identifier, a packet flow description corresponding to the application identifier and location information applicable to the packet flow description from an application, the control plane function provides the packet flow description to a user plane function corresponding to the location information applicable to the packet flow description, so that the user plane function splits traffic data corresponding to the application identifier. In the solutions of the embodiments of the present disclosure, the packet flow description is installed on the corresponding
(Continued)

user plane function by using the location information, and thus the traffic splitting is implemented.

21 Claims, 11 Drawing Sheets

(51) Int. Cl.
  *H04L 47/20* (2022.01)
  *H04L 47/2441* (2022.01)
  *H04W 28/14* (2009.01)
(58) Field of Classification Search
  USPC .......................................................... 370/229
  See application file for complete search history.

(56) References Cited

U.S. PATENT DOCUMENTS

| | | | |
|---|---|---|---|
| 2013/0336330 A1 | 12/2013 | Hedman | |
| 2013/0343181 A1* | 12/2013 | Stroud | H04L 69/22 |
| | | | 370/392 |
| 2015/0289159 A1 | 10/2015 | Jeong | |
| 2015/0334628 A1 | 11/2015 | Jeong | |
| 2018/0027451 A1* | 1/2018 | Sun | H04L 45/38 |
| | | | 370/235 |
| 2018/0192471 A1* | 7/2018 | Li | H04W 12/06 |

FOREIGN PATENT DOCUMENTS

| | | |
|---|---|---|
| CN | 104854832 A | 8/2015 |
| WO | 2014051392 A1 | 4/2014 |

OTHER PUBLICATIONS

Written Opinion of the International Searching Authority dated May 30, 2018 for International Application No. PCT/CN2018/079108, 3 pages.

\* cited by examiner

METHOD FOR IMPLEMENTING TRAFFIC SPLITTING

CROSS REFERENCE TO RELATED APPLICATIONS

This is a National Stage Application, filed under 35 U.S.C. 371, of International Patent Application No. PCT/CN2018/079108, filed on Mar. 15, 2018, which claims priority to Chinese patent application No. 201710073596.1 filed on Feb. 10, 2017, and Chinese patent application No. 201710314857.4 filed on May 7, 2017, contents of all of which are incorporated herein by reference in their entireties.

TECHNICAL FIELD

The present disclosure relates to the field of communications, and specifically, to a method and apparatus for implementing traffic splitting.

BACKGROUND

FIG. 1 is a schematic diagram of a 4th Generation (4G) network architecture in the related art. As shown in FIG. 1, the network architecture includes the following network elements.

A user equipment (UE) is accessed to the 4G network and obtains services mainly via a radio air interface. The UE interacts with a base station via the air interface, and interacts with a mobility management entity in a core network via non access stratum (NAS) signaling.

A base station is responsible for air interface resource scheduling and air interface connection management of a network to which the UE is accessed to, and is further responsible for detecting the uplink and downlink rates of a user to ensure that the uplink and downlink rates do not exceed the maximum uplink and downlink rates allowed for the user.

A mobility management entity (MME), as a core network control plane unit, is mainly responsible for: user authentication, authorization and subscription checking, to ensure that a user is a legitimate user; user mobility management, including location registration and temporary identifier allocation; IDLE state and CONNECT state maintenance and migration; a handover in the CONNECT state; packet data network (PDN) connection and bearer maintenance, including session management functions like creation, modification and deletion; paging triggering in the IDLE state of a user, and other functions.

A serving gateway (SGW), as a core network user plane functional entity, is mainly responsible for interacting with a packet data network gateway (PDN GW) in a case of roaming; caching downlink data packets received when a user is in the IDLE state and notifying the MME to page the user; and acting as the user plane anchor point across base stations and as the mobility anchor point across 2nd Generation (2G)/3rd Generation (3G)/4G systems.

A PDN GW, as a core network user plane functional unit, is an access point for the UE to access the PDN, is responsible for allocating user Internet Protocol (IP) address, establishment, modification and deletion of the network-triggered bearer. The PDN GW further has functions such as Quality of Service (QoS) control and charging, and is the anchor point of the user within the third generation partnership project (3GPP) system and for handover between 3GPP and non-3GPP systems, and thus the IP address is ensured to be unchanged and service continuity is ensured. The PDN GW is further responsible for detecting the uplink and downlink rates of a session to ensure that the uplink and downlink rates do not exceed the maximum uplink and downlink rates allowed for the user session.

Currently the industry is studying a next generation wireless communication system, namely a 5th Generation (5G) system. FIG. 2 is a schematic diagram of an architecture of the 5G system. As shown in FIG. 2, the 5G system mainly includes a base station, an access and mobility management function, a session management function, a user plane function and a policy function.

The base station is responsible for the air interface resource scheduling and air interface connection management of the network to which the UE is accessed.

The access and mobility management function (AMF) is mainly responsible for access authentication, authorization and mobility management.

The session management function (SMF) is mainly responsible for session management and IP address allocation.

The user plane function (UPF) is a connection point for external protocol data unit (PDU) sessions, and is responsible for routing, forwarding and policy execution of packet data.

The policy function (PCF) is mainly responsible for making policy decisions.

In order to reduce network latency, and avoid the detour of users' access to services and the overloading of the core network, operators always hope that users can access services nearby. In order to meet the above requirements, a network architecture shown in FIG. 3 is introduced in the 5G system. FIG. 3 is referred to as a solution of an uplink classifier (UL CL). In the architecture, the UL CL is inserted in a user plane link of the UE, and the UL CL may directly offload the services that the local data network can provide. The UL CL may be introduced during a PDU session establishment process or is introduced, when needed, after the PDU session is established. In order to enable the UL CL to properly offload services, a correct offload filter needs to be installed on the UL CL.

In the existing art, complete solutions for how to introduce an UL CL and how to install an offload filter on the UL CL have not been provided yet.

SUMMARY

Embodiments of the present disclosure provide a method and apparatus for implementing traffic splitting, so as to at least solve the problems in the related art that the UL CL cannot be dynamically introduced and the offload filter cannot be installed on the UL CL.

At least one embodiment of the present disclosure provides a method for implementing traffic splitting, including:

after obtaining an application identifier, a packet flow description corresponding to the application identifier and location information applicable to the packet flow description from an application, a control plane function providing the packet flow description to a user plane function corresponding to the location information applicable to the packet flow description, so that the user plane function splits traffic data corresponding to the application identifier.

Optionally, obtaining, by the control plane function, the application identifier, the packet flow description corresponding to the application identifier and the location information applicable to the packet flow description from the application includes:

mapping, by the control plane function, an external application identifier provided by the application to the application identifier, and/or when the location information applicable to the packet flow description is geographic location information, mapping, by the control plane function, the geographic location information to third generation partnership project location information.

Optionally, the method further includes:

selecting, by the control plane function, one user plane function as an uplink classifier, and transmitting an uplink classifier indication or a packet detection rule to the uplink classifier, where the packet detection rule includes a packet detection rule carrying the application identifier.

Optionally, selecting, by the control plane function, one user plane function as the uplink classifier includes:

in a process of establishing a protocol data unit session for a user equipment, the control plane function selecting one user plane function as the uplink classifier after obtaining an uplink classifier permission indication.

Optionally, obtaining, by the control plane function, the uplink classifier permission indication includes:

obtaining, by the control plane function, the uplink classifier permission indication from subscription information of the user equipment, or obtaining, by the control plane function, the uplink classifier permission indication from a policy transmitted by a policy function.

Optionally, selecting, by the control plane function, one user plane function as the uplink classifier includes:

after the control plane function receives application detected information that is transmitted by an anchor user plane function and indicates that an application allowing splitting is detected, selecting, by the control plane function, one user plane function as the uplink classifier when it is determined that traffic splitting is required;

or, after the control plane function receives the application detected information, that is transmitted by the anchor user plane function and indicates that the application allowing splitting is detected, transmitting, by the control plane function, the application detected information to a policy function, and selecting, by the control plane function, one user plane function as the uplink classifier according to the splitting policy after receiving a splitting policy provided by the policy function.

Optionally, the method further includes:

after the control plane function obtains an uplink classifier permission indication from subscription information of a user equipment, or receives an application identifier allowing splitting from the policy function, providing the packet detection rule containing the application identifier to the anchor user plane function, and instructing the anchor user plane function to report the application detected information to the control plane function when the anchor user plane function detects the application indicated by the application identifier.

At least one embodiment of the present disclosure provides a method for implementing traffic splitting, including:

after obtaining, by a network explore function, an application identifier, a packet flow description corresponding to the application identifier and location information applicable to the packet flow description from an application, transmitting, by the network explore function, the application identifier, the packet flow description corresponding to the application identifier and the location information applicable to the packet flow description to a packet filter descriptions function, a session management function or a policy function.

Optionally, obtaining, by the network explore function, the application identifier, the packet flow description corresponding to the application identifier and the location information applicable to the packet flow description from the application includes:

mapping, by the network explore function, an external application identifier provided by the application to the application identifier, and/or when the location information applicable to the packet flow description is geographic location information, mapping, by the network explore function, the geographic location information to third generation partnership project location information.

Optionally, transmitting, by the network explore function, the application identifier, the packet flow description corresponding to the application identifier and the location information applicable to the packet flow description to a session management function includes:

determining, by the network explore function, a session management function managing a network location area indicated by the location information applicable to the packet flow description according to the location information applicable to the packet flow description, and transmitting the application identifier, the packet flow description corresponding to the application identifier and the location information applicable to the packet flow description to the determined session management function;

or, after receiving a request message transmitted by the session management function for obtaining the packet flow description, transmitting, according to location information of a user plane function provided by the session management function, the packet flow description corresponding to the application identifier to the session management function.

At least one embodiment of the present disclosure provides a method for implementing traffic splitting, including:

after obtaining, by a packet filter descriptions function, an application identifier, a packet flow description corresponding to the application identifier and location information applicable to the packet flow description from a network explore function, transmitting, by the packet filter descriptions function, the application identifier, the packet flow description corresponding to the application identifier and the location information applicable to the packet flow description to a session management function.

Optionally, transmitting, by the packet filter descriptions function, the application identifier, the packet flow description corresponding to the application identifier and the location information applicable to the packet flow description to a session management function includes:

determining, by the packet filter descriptions function, a session management function managing a network location area indicated by the location information applicable to the packet flow description according to the location information applicable to the packet flow description, and transmitting the application identifier, the packet flow description corresponding to the application identifier and the location information applicable to the packet flow description to the determined session management function;

or, after receiving a request message transmitted by a session management function for obtaining the packet flow description, transmitting the packet flow description corresponding to the application identifier and the location information applicable to the packet flow description to the session management function according to the network location area managed by the session management function;

or, after receiving the request message transmitted by the session management function for obtaining the packet flow description, transmitting, according to location information of a user plane function provided by the session management function, the packet flow description corresponding to the application identifier to the session management function.

At least one embodiment of the present disclosure provides a method for implementing traffic splitting, including:

after obtaining, by a session management function, an application identifier, a packet flow description corresponding to the application identifier and location information applicable to the packet flow description from a network explore function, a packet filter descriptions function or a policy function, providing, by the session management function, the packet flow description to a user plane function corresponding to the location information applicable to the packet flow description, so that the user plane function splits traffic data corresponding to the application identifier.

Optionally, obtaining, by the session management function, the application identifier, the packet flow description corresponding to the application identifier and the location information applicable to the packet flow description from the network explore function, the packet filter descriptions function or the policy function includes:

obtaining, by the session management function, the application identifier, the packet flow description corresponding to the application identifier and the location information applicable to the packet flow description from the network explore function, the packet filter descriptions function or the policy function, when a cache timer of the application identifier saved locally by the session management function expires, or when the session management function needs to install or activate a packet detection rule containing the application identifier and the session management function does not have the packet flow description corresponding to the application identifier, or when the session management function installs or activates the packet detection rule containing the application identifier on the user plane function and the session management function does not have the packet flow description corresponding to a location corresponding to the user plane function.

Optionally, the method further includes:

selecting, by the session management function, one user plane function as an uplink classifier, and transmitting an uplink classifier indication or a packet detection rule to the uplink classifier, where the packet detection rule includes a packet detection rule carrying the application identifier.

Optionally, selecting, by the session management function, one user plane function as the uplink classifier includes:

in a process of establishing a protocol data unit session for a user equipment by the session management function, selecting one user plane function as the uplink classifier after obtaining an uplink classifier permission indication.

Optionally, obtaining, by the session management function, the uplink classifier permission indication includes:

obtaining, by the session management function, the uplink classifier permission indication from subscription information of the user equipment, or obtaining, by the session management function, the uplink classifier permission indication from a policy transmitted by the policy function.

Optionally, selecting, by the session management function, one user plane function as the uplink classifier includes:

after receiving, by the session management function, application detected information that is transmitted by an anchor user plane function and indicates that an application allowing splitting is detected, selecting one user plane function as the uplink classifier when it is determined that traffic splitting is required, or, after receiving, by the session management function, the application detected information that is transmitted by an anchor user plane function and indicates that an application allowing splitting is detected, transmitting the application detected information to the policy function, receiving a splitting policy provided by the policy function, and selecting one user plane function as the uplink classifier according to the splitting policy.

Optionally, the method further includes:

after the session management function obtains an uplink classifier permission indication from subscription information of a user equipment, or receives an application identifier allowing splitting from the policy function, providing the packet detection rule carrying the application identifier to the anchor user plane function, and instructing the anchor user plane function to report the application detected information to the session management function when the anchor user plane function detects the application.

At least one embodiment of the present disclosure provides a method for implementing traffic splitting, including:

after obtaining, by a policy function, an application identifier, a packet flow description corresponding to the application identifier and location information applicable to the packet flow description from a network explore function or an application, transmitting the application identifier, the packet flow description corresponding to the application identifier and the location information applicable to the packet flow description to a session management function.

Optionally, transmitting, by the policy function, the application identifier, the packet flow description corresponding to the application identifier and the location information applicable to the packet flow description to a session management function includes:

determining, by the policy function, a session management function managing a network location area indicated by the location information applicable to the packet flow description according to the location information applicable to the packet flow description, and transmitting the application identifier, the packet flow description corresponding to the application identifier and the location information applicable to the packet flow description to the determined session management function;

or, after receiving, by the policy function, a request message transmitted by the session management function for obtaining the packet flow description, transmitting, according to the network location area managed by the session management function, the packet flow description corresponding to the application identifier and the location information applicable to the packet flow description to the session management function;

or, after receiving, by the policy function, the request message transmitted by the session management function for obtaining the packet flow description, transmitting, according to location information of a user plane function provided by the session management function, the packet flow description corresponding to the application identifier to the session management function.

Optionally, the method further includes:

after receiving, by the policy function, application detected information reported by the session management function, providing, by the policy function and in response to determining that traffic splitting is required, a splitting policy to the session management function, where the splitting policy comprises location information of an uplink classifier to be selected.

At least one embodiment of the present disclosure provides an apparatus for implementing traffic splitting. The apparatus includes: a first obtaining unit and a first transmitting unit.

The first obtaining unit is configured to obtain an application identifier, a packet flow description corresponding to the application identifier and location information applicable to the packet flow description from an application.

The first transmitting unit is configured to provide the packet flow description to a user plane function corresponding to the location information applicable to the packet flow description, so that the user plane function splits traffic data corresponding to the application identifier.

Optionally, obtaining, by the first obtaining unit, the application identifier, the packet flow description corresponding to the application identifier and the location information applicable to the packet flow description from the application includes:

mapping an external application identifier provided by the application to the application identifier, and/or when the location information applicable to the packet flow description is geographic location information, mapping the geographic location information to third generation partnership project location information.

Optionally, the apparatus for implementing traffic splitting further includes: a selection unit and a user plane establishment unit.

The selection unit is configured to select one user plane function as an uplink classifier.

The user plane establishment unit is configured to transmit an uplink classifier indication or a packet detection rule to the uplink classifier, where the packet detection rule includes a packet detection rule carrying the application identifier.

Optionally, selecting, by the selection unit, one user plane function as the uplink classifier includes:

in a process of establishing a protocol data unit session for a user equipment, selecting one user plane function as the uplink classifier after obtaining an uplink classifier permission indication.

Optionally, obtaining, by the selection unit, the uplink classifier permission indication includes:

obtaining the uplink classifier permission indication from subscription information of the user equipment, or obtaining the uplink classifier permission indication from a policy transmitted by the policy function.

Optionally, selecting, by the selection unit, one user plane function as the uplink classifier includes:

after receiving application detected information that is transmitted by an anchor user plane function and indicates that an application allowing splitting is detected, selecting one user plane function as the uplink classifier when it is determined that traffic splitting is required;

or, after receiving the application detected information that is transmitted by an anchor user plane function and indicates that an application allowing splitting is detected, transmitting the application detected information to the policy function, receiving a splitting policy provided by the policy function, and selecting one user plane function as the uplink classifier according to the splitting policy.

Optionally, the user plane establishment unit is further configured to: after obtaining an uplink classifier permission indication from subscription information of a user equipment, or receiving an application identifier allowing splitting from the policy function, provide the packet detection rule carrying the application identifier to the anchor user plane function, and instruct the anchor user plane function to report the application detected information to a control plane function when the anchor user plane function detects the application indicated by the application identifier.

At least one embodiment of the present disclosure provides an apparatus for implementing traffic splitting, including: a second obtaining unit and a second transmitting unit.

The second obtaining unit is configured to obtain an application identifier, a packet flow description corresponding to the application identifier and location information applicable to the packet flow description from an application.

The second transmitting unit is configured to transmit the application identifier, the packet flow description corresponding to the application identifier and the location information applicable to the packet flow description to a packet filter descriptions function, a session management function or a policy function.

Optionally, obtaining, by the second obtaining unit, the application identifier, the packet flow description corresponding to the application identifier and the location information applicable to the packet flow description from the application includes:

mapping an external application identifier provided by the application to the application identifier, and/or when the location information applicable to the packet flow description is geographic location information, mapping the geographic location information to third generation partnership project location information.

Optionally, transmitting, by the second transmitting unit, the application identifier, the packet flow description corresponding to the application identifier and the location information applicable to the packet flow description to the session management function includes:

determining, according to the location information applicable to the packet flow description, a session management function managing a network location area indicated by the location information applicable to the packet flow description, and transmitting the application identifier, the packet flow description corresponding to the application identifier and the location information applicable to the packet flow description to the determined session management function;

or, after receiving a request message transmitted by the session management function and for obtaining the packet flow description, transmitting, according to location information of a user plane function provided by the session management function, the packet flow description corresponding to the application identifier to the session management function.

At least one embodiment of the present disclosure provides an apparatus for implementing traffic splitting, including: a third obtaining unit and a third transmitting unit.

The third obtaining unit is configured to obtain an application identifier, a packet flow description corresponding to the application identifier and location information applicable to the packet flow description from a network explore function.

The third transmitting unit is configured to transmit the application identifier, the packet flow description corresponding to the application identifier and the location information applicable to the packet flow description to a session management function.

Optionally, transmitting, by the third transmitting unit, the application identifier, the packet flow description corresponding to the application identifier and the location information applicable to the packet flow description to the session management function includes:

determining, according to the location information applicable to the packet flow description, a session management function managing a network location area indicated by the location information applicable to the packet flow description, and transmitting the application identifier, the packet flow description corresponding to the application identifier and the location information applicable to the packet flow description to the determined session management function;

after receiving a request message transmitted by the session management function for obtaining the packet flow description, transmitting, according to the network location area managed by the session management function, the packet flow description corresponding to the application identifier and the location information applicable to the packet flow description to the session management function; or, after receiving the request message transmitted by the session management function for obtaining the packet flow description, transmitting, according to location information of a user plane function provided by the session management function, the packet flow description corresponding to the application identifier to the session management function.

At least one embodiment of the present disclosure provides an apparatus for implementing traffic splitting, including: a fourth obtaining unit and a fourth transmitting unit.

The fourth obtaining unit is configured to obtain an application identifier, a packet flow description corresponding to the application identifier and location information applicable to the packet flow description from a network explore function, a packet filter descriptions function or a policy function.

The fourth transmitting unit is configured to provide the packet flow description to a user plane function corresponding to the location information applicable to the packet flow description, so that the user plane function splits traffic data corresponding to the application identifier.

Optionally, obtaining, by the fourth obtaining unit, the application identifier, the packet flow description corresponding to the application identifier and the location information applicable to the packet flow description from the network explore function, the packet filter descriptions function or the policy function includes:

obtaining the application identifier, the packet flow description corresponding to the application identifier and the location information applicable to the packet flow description from the network explore function, the packet filter descriptions function or the policy function when a cache timer that is saved locally by the session management function and for the application identifier expires, or when the session management function needs to install or activate a packet detection rule containing the application identifier and the session management function does not have the packet flow description corresponding to the application identifier, or when the session management function installs or activates the packet detection rule containing the application identifier on the user plane function and the session management function does not have a packet flow description corresponding to a location corresponding to the user plane function.

Optionally, the apparatus for implementing traffic splitting further includes: a selection unit and a user plane establishment unit.

The selection unit is configured to select one user plane function as an uplink classifier.

The user plane establishment unit is configured to transmit an uplink classifier indication or a packet detection rule to the uplink classifier, where the packet detection rule includes a packet detection rule carrying the application identifier.

Optionally, selecting, by the selection unit, one user plane function as the uplink classifier includes:

in a process of establishing a protocol data unit session for a user equipment, selecting one user plane function as the uplink classifier after obtaining an uplink classifier permission indication.

Optionally, obtaining, by the selection unit, the uplink classifier permission indication includes:

obtaining the uplink classifier permission indication from subscription information of the user equipment, or obtaining the uplink classifier permission indication from a policy transmitted by the policy function.

Optionally, selecting, by the selection unit, one user plane function as the uplink classifier includes:

after receiving application detected information that is transmitted by an anchor user plane function and indicates an application allowing splitting is detected, selecting one user plane function as the uplink classifier when it is determined that traffic splitting is required, or after receiving the application detected information that is transmitted by the anchor user plane function and indicates an application allowing splitting is detected, transmitting the application detected information to the policy function, receiving a splitting policy provided by the policy function, and then selecting one user plane function as the uplink classifier according to the splitting policy.

Optionally, the user plane establishment unit is further configured to: after obtaining an uplink classifier permission indication from subscription information of a user equipment or receiving an application identifier allowing splitting from the policy function, provide the packet detection rule carrying the application identifier to the anchor user plane function, and instruct the anchor user plane function to report the application detected information to a session management function when the anchor user plane function detects the application indicated by the application identifier.

At least one embodiment of the present disclosure provides an apparatus for implementing traffic splitting, including:

a fifth obtaining unit, which is configured to obtain an application identifier, a packet flow description corresponding to the application identifier and location information applicable to the packet flow description from a network explore function or an application; and a fifth transmitting unit, which is configured to transmit the application identifier, the packet flow description corresponding to the application identifier and the location information applicable to the packet flow description to a session management function.

Optionally, transmitting, by the fifth transmitting unit, the application identifier, the packet flow description corresponding to the application identifier and the location information applicable to the packet flow description to a session management function includes:

determining, according to the location information applicable to the packet flow description, a session management function managing a network location area indicated by the location information applicable to the packet flow description, and transmitting the application identifier, the packet flow description corresponding to the application identifier and the location information applicable to the packet flow description to the determined session management function;

or, after receiving a request message transmitted by the session management function for obtaining the packet flow description, transmitting, the packet flow description corresponding to the application identifier and the location information applicable to the packet flow description to the session management function according to the network location area managed by the session management function;

or, after receiving the request message for obtaining the packet flow description from the session management function, transmitting, according to location information of a user plane function provided by the session management function, the packet flow description corresponding to the application identifier to the session management function.

Optionally, the apparatus for implementing traffic splitting further includes:

a decision unit, which is configured to after receiving application detected information that is reported by the session management function and indicates that an application allowing splitting is detected, provide a splitting policy to the session management function, when it is determined that traffic splitting is required, where the splitting policy includes location information of an uplink classifier to be selected.

At least one embodiment of the present disclosure provides an apparatus for implementing traffic splitting, which includes a memory and a processor. The memory is configured to store programs. The programs, when fetched and executed by the processor, execute the following operations:

obtaining an application identifier, a packet flow description corresponding to the application identifier and location information applicable to the packet flow description from a network explore function, a packet filter descriptions function or a policy function, and then providing the packet flow description to a user plane function corresponding to the location information applicable to the packet flow description, so that the user plane function splits traffic data corresponding to the application identifier.

Optionally, the programs, when fetched and executed by the processor, further execute the following operations:

selecting one user plane function as an uplink classifier, and transmitting an uplink classifier indication or a packet detection rule to the uplink classifier, where the packet detection rule includes a packet detection rule carrying the application identifier.

Optionally, selecting one user plane function as the uplink classifier includes:

in a process of establishing a protocol data unit session for a user equipment, selecting one user plane function as the uplink classifier after obtaining an uplink classifier permission indication.

Optionally, selecting one user plane function as the uplink classifier includes: after receiving application detected information that is transmitted by an anchor user plane function and indicates that an application allowing splitting is detected, selecting one user plane function as the uplink classifier when it is determined that traffic splitting is required, or after receiving the application detected information that is transmitted by the anchor user plane function and indicates that an application allowing splitting is detected, transmitting the application detected information to the policy function, receiving a splitting policy provided by the policy function, and then selecting one user plane function as the uplink classifier according to the splitting policy.

Another embodiment of the present disclosure further provides a storage medium. The storage medium stores computer programs. The computer programs, when being ran, execute the steps of any one of the method embodiments described above.

Another embodiment of the present disclosure further provides an electronic apparatus, including a memory and a processor. The memory is configured to store computer programs and the processor is configured to run the computer programs for executing the steps of any one of the method embodiments described above.

Compared with the existing art, in some embodiments of the present disclosure, the packet flow description is installed on the corresponding user plane function according to the location information, and thus the traffic splitting is implemented. In addition, a specific implementation solution for introducing an UL CL during a PDU session establishment process or after the PDU session is established. The UL CL is introduced when there is an UL CL indication, or when a specific application is detected.

Additional features and advantages of the preset disclosure will be set forth in the description which follows, and in part will be obvious from the description, or may be learned by practice of the present disclosure. The objects and other advantages of the present disclosure can be implemented and obtained through the structure especially indicated in the specification, claims and drawings.

BRIEF DESCRIPTION OF DRAWINGS

The drawings are used to provide a further understanding of the technical solutions of the present disclosure, constitute a part of the specification, explain the technical solutions of the present disclosure in conjunction with the embodiments of the present application, and do not limit the technical solutions of the present disclosure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

The steps illustrated in the flowcharts of the drawings may be executed by, for example, a set of computer-executable instructions in a computer system. Moreover, although the flowcharts illustrate a logical order, the steps illustrated or described may, in some cases, be executed in an order different from that herein.

It is to be noted that the terms "first", "second" and the like in the specification, claims and drawings of the present disclosure are used to distinguish between similar objects and are not necessarily used to describe a particular order or sequence. It is to be understood that the terms used in this way may be exchanged where appropriate so that embodiments of the present disclosure described herein may also be implemented in a sequence not illustrated or described herein. In addition, the terms "comprising", "including" or any other variations thereof described herein are intended to encompass a non-exclusive inclusion. For example, a process, method, system, product or device that includes a series of steps or units not only includes the expressly listed steps or units but may also include other steps or units that are not expressly listed or are inherent to such process, method, product or device.

Figure 1:
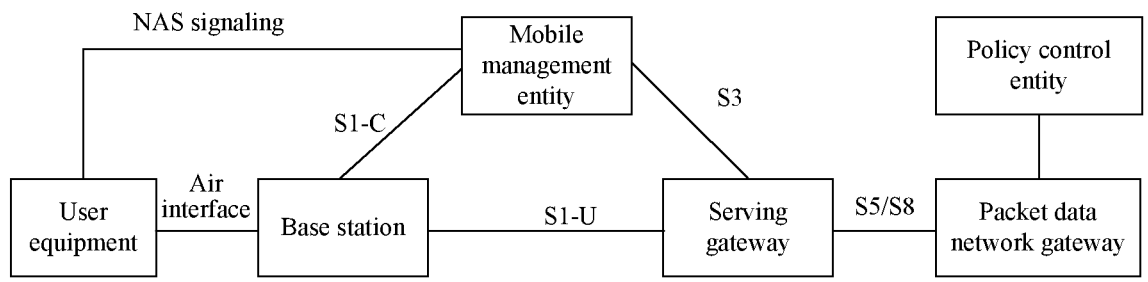
FIG. 1 is a schematic diagram of an architecture of a 4G network in the related art.
Figure 2:
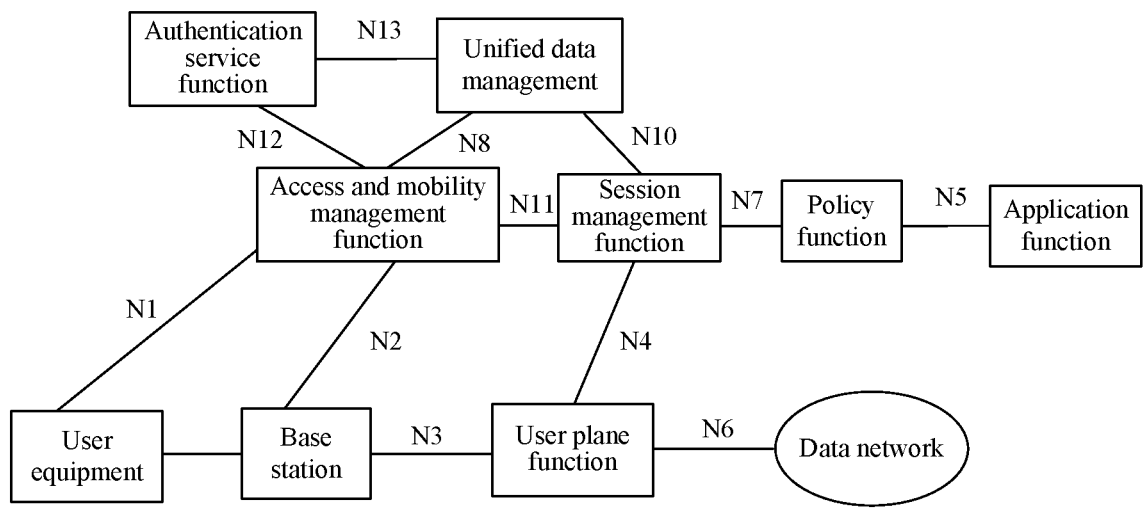
FIG. 2 is a structural diagram of a next generation wireless communication system in the related art.
Figure 3:
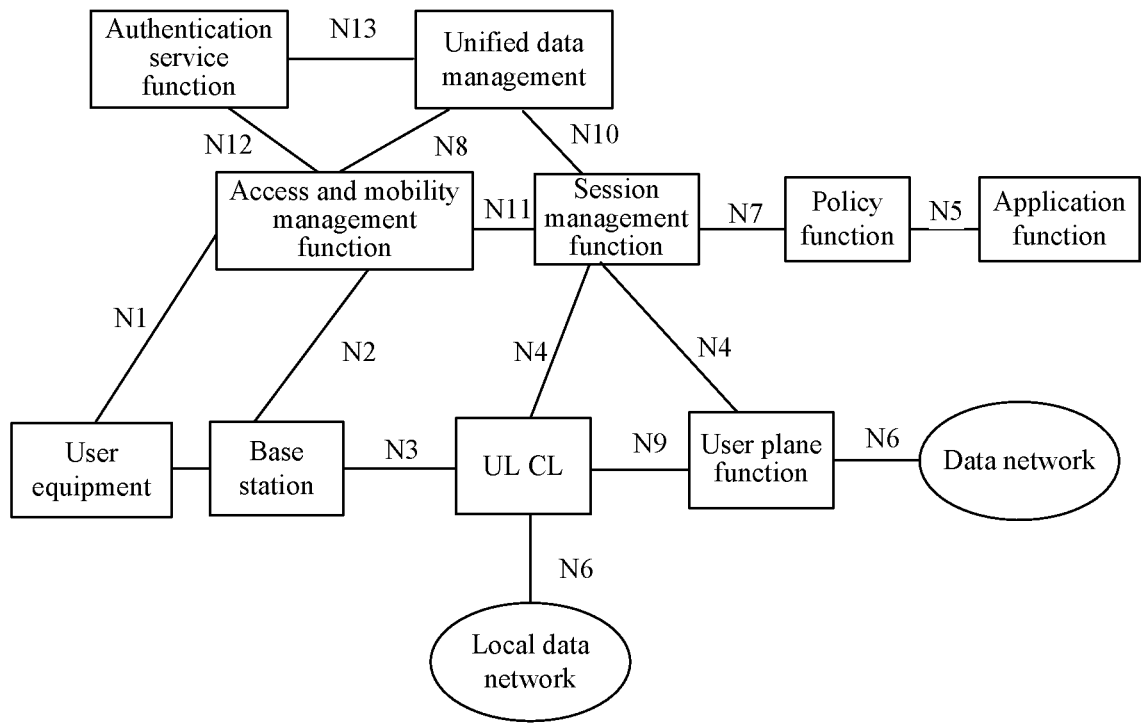
FIG. 3 is a schematic diagram of a wireless communication system architecture after an UL CL is introduced.
Figure 4A:
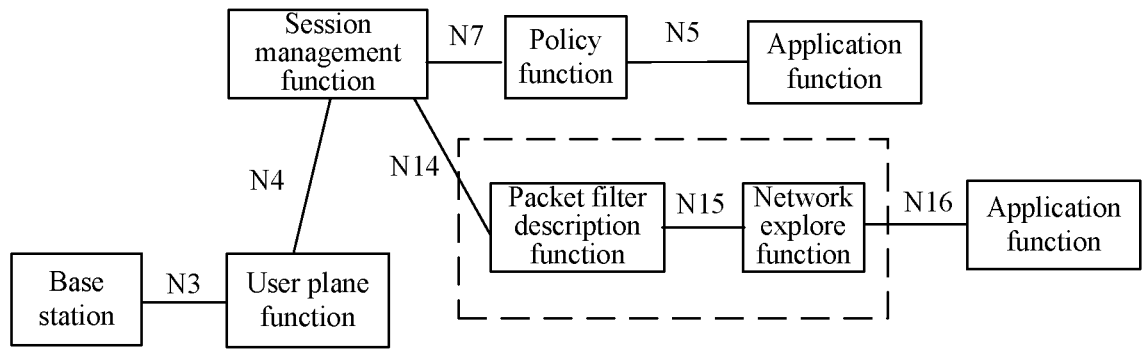
FIG. 4*a* is a schematic diagram of a wireless communication system architecture after a packet filter descriptions function is introduced.
Figure 4B:
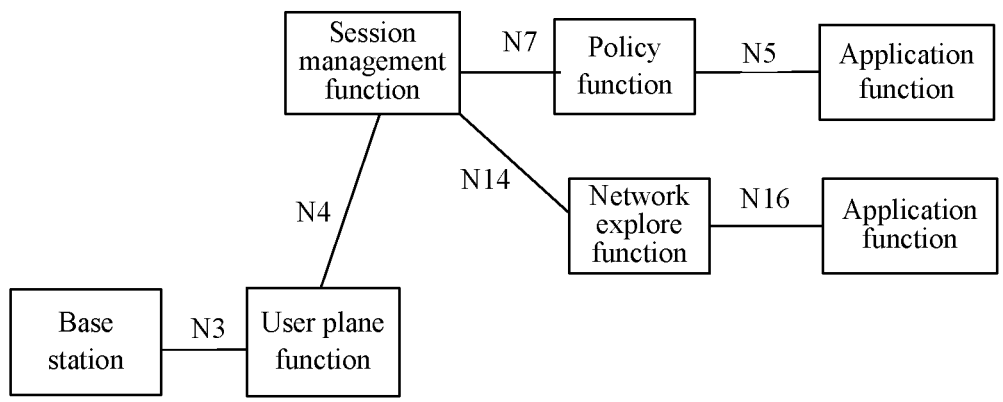
FIG. 4*b* is a schematic diagram of a system architecture after the packet filter descriptions function is integrated into a network explore function.
Figure 4C:
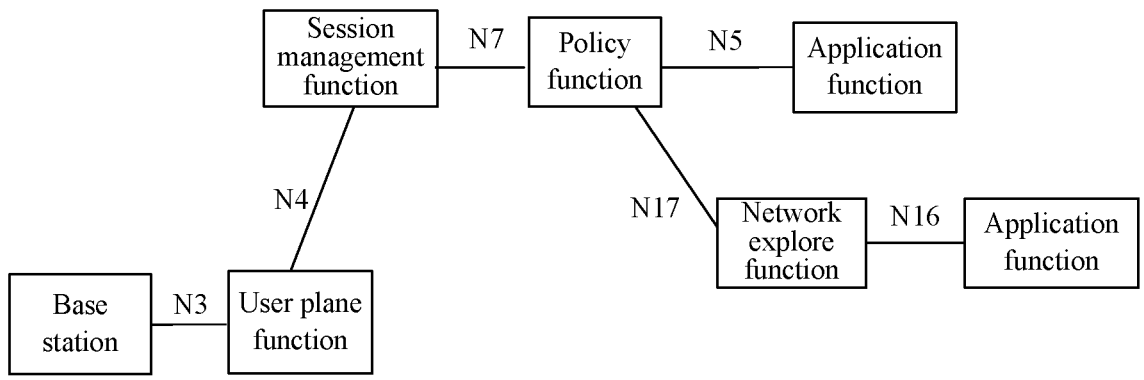
FIG. 4*c* is a schematic diagram of a system architecture in which the network explore function provides a packet flow description to a policy function.
Figure 4D:
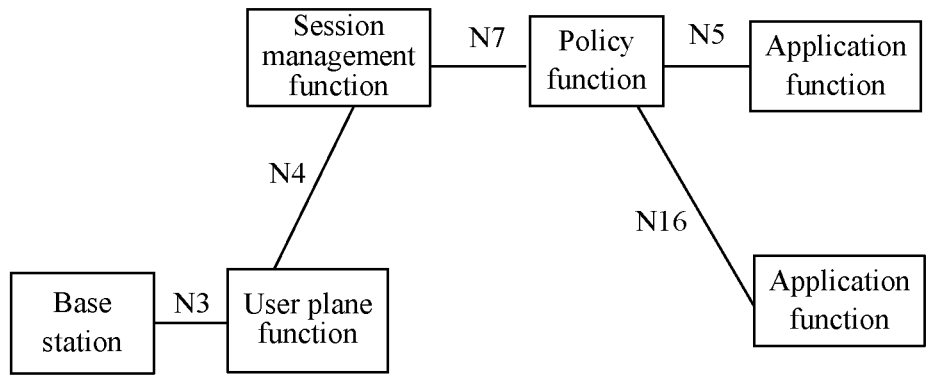
FIG. 4*d* is a schematic diagram of a system architecture in which an application function of a third party directly provides the packet flow description to the policy function.

In at least one embodiment of the present disclosure, as shown in FIG. 4a, a packet filter descriptions function (PFDF) and a network explore function (NEF) are introduced into a network architecture shown in FIG. 2. The NEF is configured to expose, to third parties, entities whose services and capabilities are provided by the 3GPP network. The NEF obtains a packet flow description (PFD) from an application layer (particularly a third-party application), performs operations such as authorization on the PFD, and then further provides the PFD to the PFDF. The PFDF saves the PFD that is associated with an application identifier and provided by the application layer, and provides it to a proper UPF. In the specific deployment, the PFDF may also be integrated in the NEF. As shown in FIG. 4b, the PFDF is integrated in the NEF. FIG. 4c is an architecture in which the NEF provides the authorized PFD to a PCF, and the PCF saves the PFD associated with the application layer. In FIG. 4d, when the third-party application is trusted by the network of the operator, the third-party application function (AF) directly interacts with the PCF to provide the PFD.

At least one embodiment of the present disclosure provides a method for traffic splitting. The method includes the steps described below.

A control plane function obtains an application identifier, a packet flow description corresponding to the application identifier and location information applicable to the packet flow description from an application, and then provides the packet flow description to a user plane function corresponding to the location information applicable to the packet flow description, so that the user plane function splits traffic data corresponding to the application identifier.

The step in which the control plane function obtains the application identifier, the packet flow description corresponding to the application identifier and the location information applicable to the packet flow description from the application includes the steps described below.

The control plane function maps an external application identifier provided by the application to the application identifier.

And/or when the location information applicable to the packet flow description is geographic location information, the control plane function maps the geographic location information to third generation partnership project location information.

In an alternative embodiment of the present disclosure, the control plane function selects one user plane function as an uplink classifier, and transmits an uplink classifier indication or a packet detection rule to the uplink classifier. The packet detection rule includes a packet detection rule carrying the application identifier. The uplink classifier indication or the packet detection rule may be carried in a user plane establishment request message.

In an alternative embodiment of the present disclosure, the step in which the control plane function selects one user plane function as the uplink classifier includes the steps described below.

In a process of establishing a PDU session for a user equipment, the control plane function obtains an uplink classifier permission indication, and then selects one user plane function as the uplink classifier.

In an alternative embodiment of the present disclosure, the step in which the control plane function obtains the uplink classifier permission indication includes the step described below.

The control plane function obtains the uplink classifier permission indication from subscription information of the user equipment, or the control plane function obtains the uplink classifier permission indication from a policy transmitted by a policy function.

In an alternative embodiment of the present disclosure, the step in which the control plane function selects one user plane function as the uplink classifier includes the steps described below.

After receiving application detected information that is transmitted by an anchor user plane function and indicates that an application allowing splitting is detected, the control plane function selects, when it is determined that traffic splitting is required, one user plane function as the uplink classifier.

Or,

After receiving the application detected information that is transmitted by an anchor user plane function and indicates that an application allowing splitting is detected, the control plane function transmits the application detected information to a policy function, receives a splitting policy provided by the policy function, and then selects one user plane function as the uplink classifier according to the splitting policy.

In an alternative embodiment of the present disclosure, the method further includes that after obtaining an uplink classifier permission indication from subscription information of a user equipment, or receiving an application identifier that allows splitting from the policy function, the control plane function provides the packet detection rule containing the application identifier to the anchor user plane function, and instructs the anchor user plane function to report the application detected information to the control plane function when the application indicated by the application identifier is detected.

In an embodiment of the present disclosure, the control plane function may include a network explore function, a packet filter descriptions function and a session management function.

At least one embodiment of the present disclosure provides a method for implementing traffic splitting, including the steps described below.

A network explore function obtains an application identifier, a packet flow description corresponding to the application identifier and location information applicable to the packet flow description from an application, and then transmits the application identifier, the packet flow description corresponding to the application identifier and the location information applicable to the packet flow description to a packet filter descriptions function, a session management function or a policy function.

The location information received by the network explore function is geographic location information or network location area information (e.g., 3GPP location information). The geographic location information is, for example, latitude and longitude information, and the network location area information is information about, for example, a routing area/tracking area list, a cell list, or a base station list. In another embodiment of the present disclosure, when the location information received by the network explore function is geographic location information, the network explore function converts the geographic location information to network location area information before transmitting the location information to the packet filter descriptions function or the session management function.

In an alternative embodiment of the present disclosure, the step in which the network explore function obtains the application identifier, the packet flow description corresponding to the application identifier and the location information applicable to the packet flow description from the application includes the steps described below.

The network explore function maps an external application identifier provided by the application to the application identifier.

And/or when the location information applicable to the packet flow description is geographic location information, the network explore function maps the geographic location information to third generation partnership project location information.

In an alternative embodiment of the present disclosure, the step in which the network explore function transmits the application identifier, the packet flow description corresponding to the application identifier and the location information applicable to the packet flow description to the session management function includes the steps described below.

The network explore function determines a session management function managing a network location area indicated by the location information applicable to the packet flow description according to the location information applicable to the packet flow description, and transmits the application identifier, the packet flow description corresponding to the application identifier and the location information applicable to the packet flow description to the determined session management function.

Or,

After receiving a request message for obtaining the packet flow description and transmitted by the session management function, the network explore function transmits the packet flow description corresponding to the application identifier to the session management function according to location information of a user plane function provided by the session management function.

At least one embodiment of the present disclosure provides a method for implementing traffic splitting, including the steps described below.

A packet filter descriptions function obtains an application identifier, a packet flow description corresponding to the application identifier and location information applicable to the packet flow description from a network explore function, and then transmits the application identifier, the packet flow description corresponding to the application identifier and the location information applicable to the packet flow description to a session management function.

The packet filter descriptions function or the network explore function may transmit the application identifier, the packet flow description corresponding to the application identifier and the location information applicable to the packet flow description to the session management function corresponding to the location information applicable to the packet flow description in an active manner, for example, in a Push mode, or after receiving a request from the session management function, for example, in a Pull mode.

In an alternative embodiment of the present disclosure, the active transmission is implemented as follows.

The packet filter descriptions function determines a session management function managing a network location area indicated by the location information applicable to the packet flow description according to the location information applicable to the packet flow description, and transmits the application identifier, the packet flow description corresponding to the application identifier and the location information applicable to the packet flow description to the determined session management function.

In an alternative embodiment of the present disclosure, the transmission after the request from the session management function is received is implemented as follows.

After receiving a request message transmitted by the session management function for obtaining the packet flow description, the packet filter descriptions function or the network explore function transmits, according to the network location area managed by the session management function, the packet flow description corresponding to the application identifier and the location information applicable to the packet flow description to the session management function.

Or,

After receiving the request message for obtaining the packet flow description and transmitted by the session management function, the packet filter descriptions function or the network explore function transmits the packet flow description corresponding to the application identifier to the session management function according to location information of a user plane function provided by the session management function.

At least one embodiment of the present disclosure further provides a method for implementing traffic splitting, including the steps described below.

A session management function obtains an application identifier, a packet flow description corresponding to the application identifier and location information applicable to the packet flow description from a network explore function, a packet filter descriptions function or a policy function, and then provides the packet flow description to a user plane function corresponding to the location information applicable to the packet flow description, so that the user plane function splits traffic data corresponding to the application identifier.

In an alternative embodiment of the present disclosure, the step in which the session management function obtains the application identifier, the packet flow description corresponding to the application identifier and the location information applicable to the packet flow description from the network explore function or the packet filter descriptions function includes the steps described below.

When a preset trigger condition is met, the session management function transmits a request message for obtaining the packet flow description to the packet filter descriptions function or the network explore function, and receives the application identifier, the packet flow description corresponding to the application identifier and the location information applicable to the packet flow description returned by the network explore function or the packet filter descriptions function.

The preset trigger condition includes one of the following.

A cache timer of the application identifier saved locally by the session management function expires.

Alternatively, the session management function needs to install or activate a packet detection rule containing the application identifier and the session management function does not have the packet flow description corresponding to the application identifier.

Alternatively, the session management function installs or activates the packet detection rule containing the application identifier on the user plane function and the session management function does not have a packet flow description corresponding to a location corresponding to the user plane function.

In an alternative embodiment of the present disclosure, the method further includes the steps described below.

The session management function selects one user plane function as an uplink classifier, and transmits an uplink classifier indication or a packet detection rule to the uplink classifier, where the packet detection rule includes a packet detection rule carrying the application identifier.

The uplink classifier is a user plane function, and the uplink classifier may perform traffic splitting after the packet flow description corresponding to the application identifier in the packet detection rule in the user plane function is installed.

The session management function selects the uplink classifier in the establishment of the PDU session or after the PDU session is established. Optionally, in an optional embodiment of the present disclosure, the step in which the session management function selects one user plane function as the uplink classifier includes the steps described below.

In a process of establishing a PDU session for a user equipment, the session management function obtains an uplink classifier permission indication, and then selects one user plane function as the uplink classifier. The session management function obtains the uplink classifier permission indication from subscription information of the user, or the session management function obtains the uplink classifier permission indication from a policy transmitted by the policy function.

In an alternative embodiment of the present disclosure, the step in which the session management function selects one user plane function as the uplink classifier includes the steps described below.

The session management function receives application detected information that is transmitted by an anchor user plane function and indicates that an application allowing splitting is detected, and then selects, when it is determined that traffic splitting is required, one user plane function as the uplink classifier.

Alternatively, the session management function receives the application detected information that is transmitted by an anchor user plane function and indicates that an application allowing splitting is detected, transmits the application detected information to the policy function, receives a splitting policy provided by the policy function, and then selects one user plane function as the uplink classifier according to the splitting policy.

The packet detection rule transmitted by the session management function to the uplink classifier includes a packet detection rule of the application identifier carried in an application information reported message. Of course, the packet detection rule may further include a packet detection rule carrying another application identifier.

In an alternative embodiment of the present disclosure, the session management function obtains an uplink classifier permission indication from subscription information of a user equipment. Alternatively, after receiving an application identifier allowing splitting from the policy function, the session management function provides the packet detection rule carrying the application identifier to the anchor user plane function, and instructs the anchor user plane function to report the application detected information to the session management function when detecting the application.

At least one embodiment of the present disclosure provides a method for implementing traffic splitting, including the steps described below.

A policy function obtains an application identifier, a packet flow description corresponding to the application identifier and location information applicable to the packet flow description from a network explore function or an application, and then transmits the application identifier, the packet flow description corresponding to the application identifier and the location information applicable to the packet flow description to a session management function.

In an alternative embodiment of the present disclosure, the step in which the policy function transmits the application identifier, the packet flow description corresponding to the application identifier and the location information applicable to the packet flow description to the session management function includes the steps described below.

The policy function determines a session management function managing a network location area indicated by the location information applicable to the packet flow description according to the location information applicable to the packet flow description, and transmits the application identifier, the packet flow description corresponding to the application identifier and the location information applicable to the packet flow description to the determined session management function.

Alternatively, after receiving a request message transmitted by the session management function for obtaining the packet flow description, the policy function transmits, according to the network location area managed by the session management function, the packet flow description corresponding to the application identifier and the location information applicable to the packet flow description to the session management function.

Alternatively, after receiving the request message transmitted by the session management function for obtaining the packet flow description, the policy function transmits, according to location information of a user plane function provided by the session management function, the packet flow description corresponding to the application identifier to the session management function.

In an alternative embodiment of the present disclosure, the method further includes the steps described below.

After receiving the application detected information reported by the session management function, the policy function provides, when it is determined that traffic splitting is required, a splitting policy to the session management function, where the splitting policy includes location information of an uplink classifier to be selected.

Embodiment 1

Figure 5:
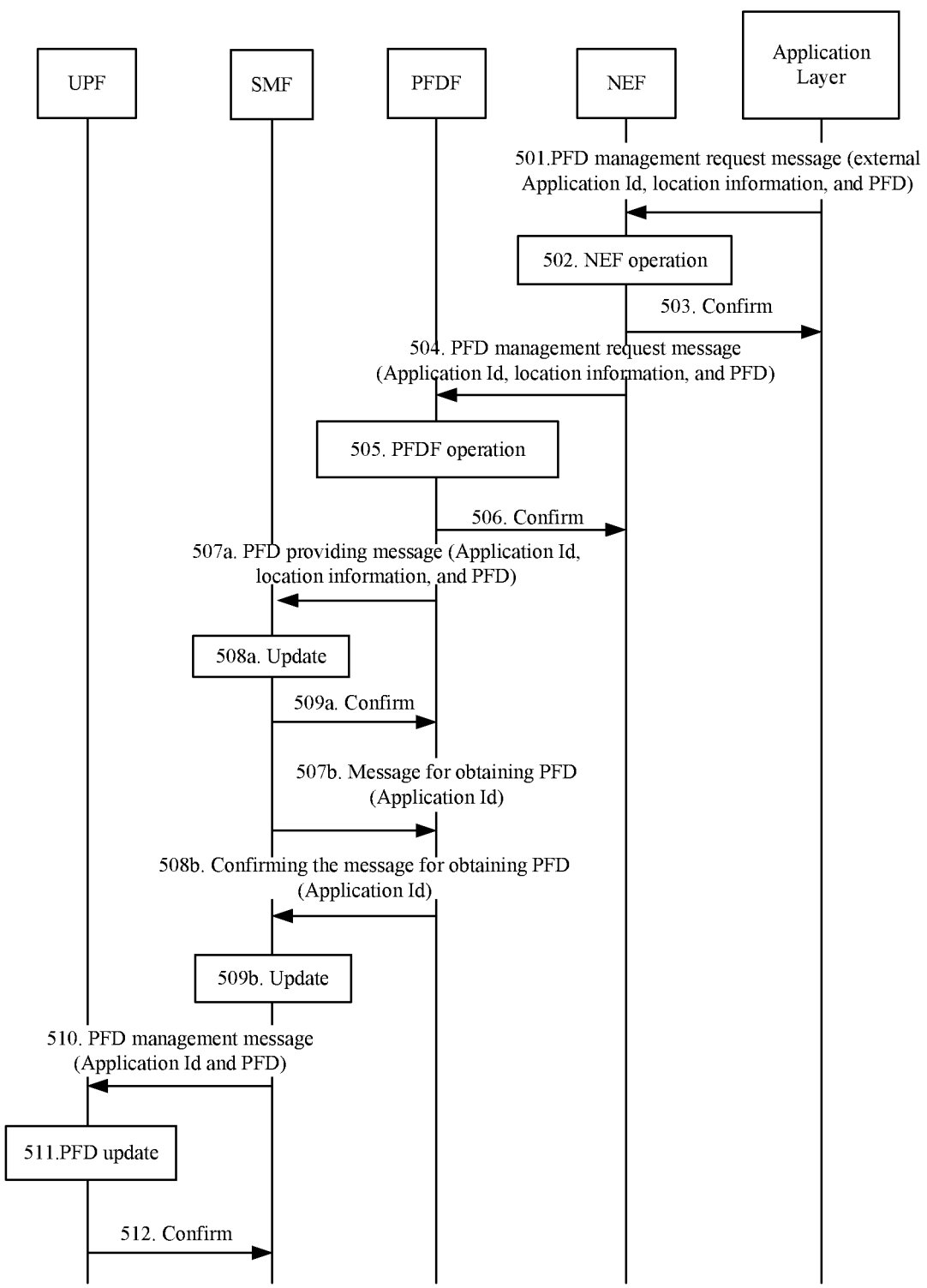
FIG. 5 is a flowchart in which a PFDF provides packet flow description information offered by an application to a proper UPF according to an embodiment 1 of the present disclosure.

FIG. 5 is a flowchart of a process in which a PFDF sends packet flow description information provided by an application to a proper UPF according to an embodiment 1 of the present disclosure. The embodiment is based on an architecture shown in FIG. 4a in which the PFDF and a NEF are separately arranged. As shown in FIG. 5, the process includes the following steps.

In a step 501, an application (such as a third-party services capability server (SCS)/application server (AS)) transmits a PFD management request message to the NEF, where the PFD management request message carries a SCS/AS identifier, a service provider (SP) reference identifier, an external Application Id, a PFD to be added or modified, and corresponding location information.

The application servers may be deployed in multiple areas for an application to implement load sharing or nearest access. Therefore, for the same external Application Id, the PFDs corresponding to different location information are usually different.

The location information may be geographic location information (such as latitude and longitude), or 3GPP location area (such as a routing area/tracking area list, a cell list, a base station list, or a data network access identifier (DNAI) which represents a user plane identifier for accessing a data network).

In a step 502, the NEF performs authorization, and converts the external Application Id into an Application Id that is known by the PFDF. The conversion may be performed according to a preset mapping table. If the location information provided by the application is the geographic location information, the NEF needs to map the location information to a corresponding 3GPP location area.

In a step 503, the NEF returns a confirmation message to the application.

In a step 504, the NEF transmits a PFD management request message to the PFDF, where the PFD management request message carries a NEF identifier, a NEF reference identifier, the Application Id, the PFD to be added or modified, and the corresponding 3GPP location area.

In a step 505, the PFDF saves the received information, that is, saves the information carried in the PFD management request message.

In a step 506, the PFDF returns a confirmation message to the NEF.

The PFDF provides a PFD to SMF. The PFDF may provide the PFD to the SMF in a Push mode or Pull mode. In the embodiment, the PFDF provides the PFD to the SMF in the Push mode, and steps 507a to 509a are performed and described below.

In a step 507a, after the PFDF determines, according to each PFD's corresponding location area, the SMF to which the PFD is pushed (that is, the SMF is responsible for managing the location area corresponding to the PFD), the PFDF transmits a PFD providing/updating message to the SMF, where the PFD providing/updating message carries the Application Id, PFD adding or PFD modifying and the corresponding location area.

If the SMF management in the network is not location-dependent, the PFDF needs to provide PFDs to all SMFs in the network.

In a step 508a, the SMF saves the received information and updates the locally saved Application Id, PFD, and corresponding location area.

In a step 509a, the SMF returns a confirmation message to the PFDF.

In a step 510, if the Application Id is carried in an activated packet detection rule (PDR) of a UPF that is managed by the SMF, the SMF provides a corresponding PFD to the UPF according to the location area managed by the UPF. The SMF transmits a PFD management message to the UPF, where the PFD management message carries the Application Id and the PFD. If the location information received by the SMF is the DNAI, the SMF needs to map the DNAI to the corresponding routing area/tracking area identifier, cell identifier, and/or base station identifier or other location information, and then provide the PFD to the corresponding UPF.

The SMF locally stores information of the activated packet detection rule of each UPF managed by the SMF itself.

In a step 511, after receiving the PFD management message, the UPF updates the locally saved correspondence relationship between the Application Id and PFD according to the Application Id and the PFD carried in the PFD management message.

In a step 512, the UPF returns a confirmation message to the SMF.

The SMF performs the step 510 for all UPFs in its management area (also called a service area), so that PFD addition or update is performed for all UPFs in the management area of the SMF.

Through the above process, each UPF saves the PFD of each application that the UPF can access nearby.

In another embodiment of the present disclosure, if the PFDF provides the PFD to the SMF in the Pull mode, steps 507b to 509b are used to replace the steps 507a to 509a in the above-mentioned embodiment and steps 507b to 509b are described below.

In a step 507b, when a preset trigger condition is met, the SMF transmits a request message for obtaining a PFD to the PFDF, where the message carries an Application Id. If the SMF has selected a UPF where the packet detection rule needs to be installed or activated, the SMF carries the location information corresponding to the UPF in the request message, such as the routing area/tracking area identifier, the cell identifier, the base station identifier, and/or the DNAI.

The preset trigger condition may be as follows: A cache timer of the Application Id expires, or the SMF needs to activate a policy rule containing the Application Id while the SMF does not have a corresponding PFD, or the SMF needs to install or activate a packet detection rule containing the Application Id on a UPF while the SMF does not have a PDF corresponding to a location corresponding to the UPF. Of course, other trigger conditions may also be set as needed, which is not limited in the present application.

In a step 508b, the PFDF determines the PFD transmitted to the SMF according to the area managed by the SMF. The message carries the Application Id, PFD adding or modifying and the corresponding location area. If the location information is carried in the request message transmitted by the SMF for obtaining the PFD, the PFDF provides the corresponding PFD to the SMF according to the location information carried in the request message for obtaining the PFD.

In a step 509b, the SMF saves the received information and updates the locally saved Application Id, PFD, and corresponding location area.

In other embodiments of the present disclosure, if the PFDF is integrated in the NEF, for example, based on the architecture shown in FIG. 4b, the operations performed by the PFDF in the above-mentioned embodiment are then performed by the NEF, and the NEF interacts with the SMF and provides the Application Id and the correspondence relationship between the PFD and the location.

Embodiment 2

Figure 5A:
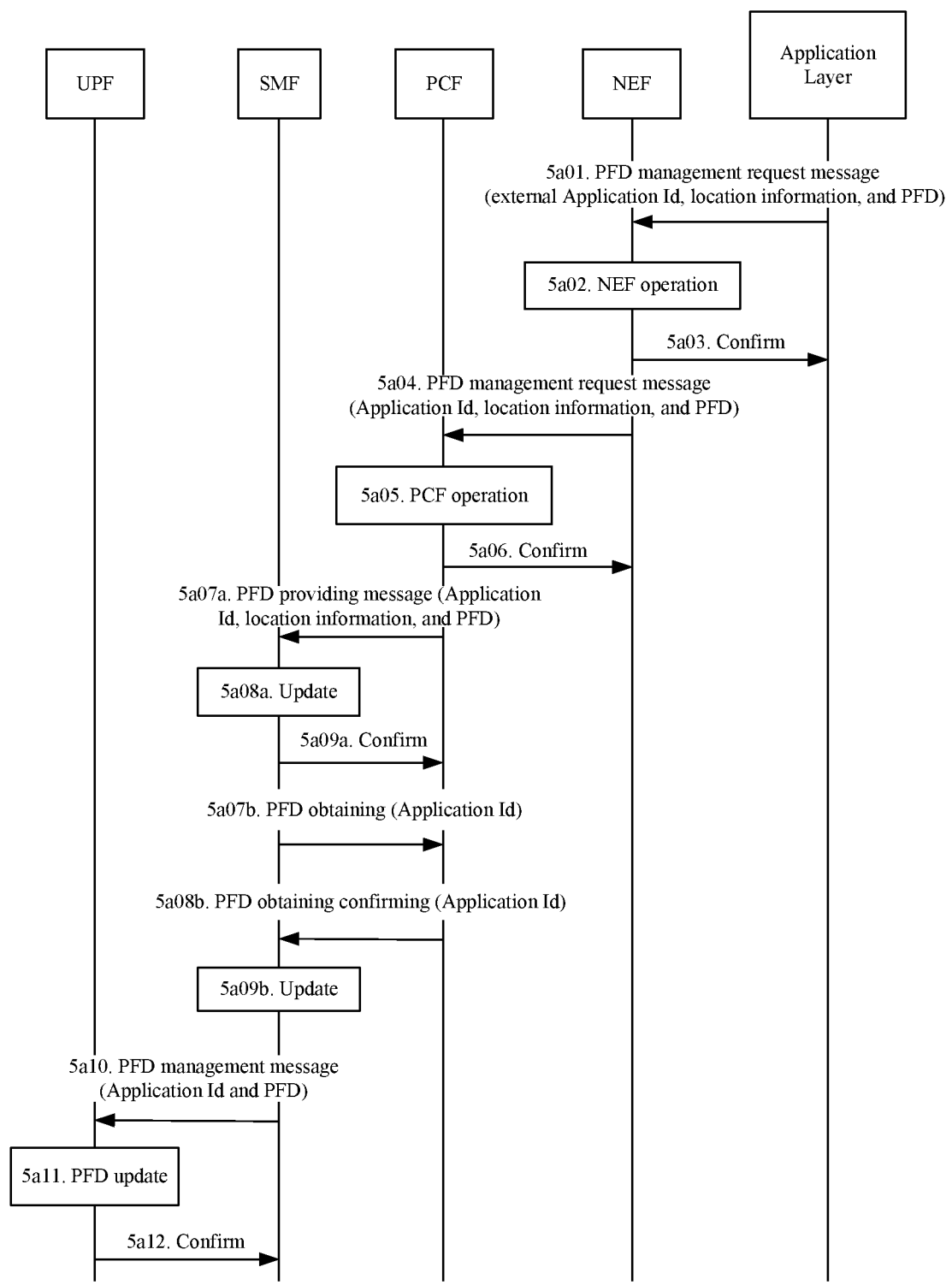
FIG. 5a is a flowchart in which a PCF provides packet flow description information offered by an application to a proper UPF according to an embodiment 2 of the present disclosure.

FIG. 5a is a flowchart of a process in which a PCF sends packet flow description information provided by an application to a proper UPF according to an embodiment 2 of the present disclosure. The embodiment is based on an architecture shown in FIG. 4c, and a third party application provides a PFD to the PCF via a NEF. As shown in FIG. 5a, the process includes the steps described below.

In a step 5a01, an application (such as a SCS/AS) transmits a PFD management request message to the NEF, where the PFD management request message carries a SCS/AS identifier, a SP reference identifier, an external Application Id, a PFD to be added or modified, and corresponding location information.

An application may deploy the application servers in multiple areas to implement load sharing or nearby access. Therefore, for the same external Application Id, the PFDs corresponding to different location information are usually different.

The location information may be geographic location information (such as latitude and longitude), or 3GPP location area (such as a routing area/tracking area list, a cell list, a base station list, or a DNAI which represents a user plane identifier for accessing a data network).

In a step 5a02, the NEF performs authorization, and converts the external Application Id into an Application Id that is known by the PCF. The conversion may be performed according to a preset mapping table. If the location information provided by the application is the geographic location information, the NEF needs to map the geographic location information to a corresponding 3GPP location area.

In a step 5a03, the NEF returns a confirmation message to the application.

In a step 5a04, the NEF transmits a PFD management request message to the PCF, where the PFD management request message carries a NEF identifier, a NEF reference identifier, the Application Id, the PFD requested to be added or modified, and the corresponding 3GPP location area.

In a step 5a05, the PCF saves the received information, that is, saves the information carried in the PFD management request message.

In a step 5a06, the PCF returns a confirmation message to the NEF.

The PCF may provide the PFD to the SMF in a Push mode or in a Pull mode. In the embodiment, the PCF provides the PFD to the SMF in the Push mode, and steps 5a07a to 5a09a are performed and described below.

In a step 5a07a, the PCF determines, according to each PFD's corresponding location area, the SMF to which the PFD is pushed (that is, the SMF is responsible for managing the location area corresponding to the PFD), the PCF has provided a policy rule carrying the Application Id to the SMF, and the PCF transmits a PFD providing/updating message to the SMF, where the PFD providing/updating message carries the Application Id, a newly added or modified PFD and the corresponding location area. If the SMF management in the network is not location-dependent, the PCF needs to provide PFDs to all SMFs in the network.

In a step 5a08a, the SMF saves the received information and updates the locally saved Application Id, PFD, and corresponding location area information.

In a step 5a09a, the SMF returns a confirmation message to the PCF.

In a step 5a10, the SMF provides a corresponding PFD to the UPF according to the location area that the UPF is responsible for managing. The SMF transmits a PFD management message to the UPF, where the PFD management message carries the Application Id and the PFD. If the location information received by the SMF is the DNAI, the SMF needs to map the DNAI to the corresponding routing area/tracking area identifier, cell identifier, and/or base station identifier or other location information, and then provide the PFD to the corresponding UPF.

The SMF locally stores information of the activated packet detection rule of each UPF managed by the SMF.

In a step 5a11, after receiving the PFD management message, the UPF updates the locally saved correspondence relationship between the Application Id and PFD according to the Application Id and the PFD carried in the PFD management message.

In a step 5a12, the UPF returns a confirmation message to the SMF.

The SMF performs the step 5a10 for all UPFs in a management area (also called a service area), so that PFD addition or update is performed for all UPFs in the management area of the SMF.

Through the above process, each UPF saves the PFD of each application that the UPF can access nearby via itself.

In another embodiment of the present disclosure, if the PCF provides the PFD to the SMF in the Pull mode, steps 5a07b to 5a09b are used to replace the steps 5a07a to 5a09a in the above-mentioned embodiment and the steps 5a07b to 5a09b are described below.

In a step 5a07b, when a preset trigger condition is met, the SMF transmits a request message for obtaining a PFD to the PCF, where the message carries an Application Id. If the SMF has selected a UPF where the packet detection rule needs to be installed or activated, the request message transmitted by the SMF carries the location information corresponding to the UPF, such as the routing area/tracking area identifier, the cell identifier, the base station identifier, and/or the DNAI.

The preset trigger condition may be as follows: A cache timer of the Application Id expires, or the SMF needs to activate a policy rule containing the Application Id while the SMF does not have the PFD corresponding to the Application Id, or the SMF needs to install or activate a packet detection rule containing the Application Id on one UPF while the SMF does not have a PDF corresponding to a location corresponding to the UPF. Of course, other trigger conditions may also be set as needed, which is not limited in the present application.

In a step 5a08b, the PCF determines the PFD transmitted to the SMF according to the area managed by the SMF. The message carries the Application Id, adding or modifying PFD and the corresponding location area. If the location information is carried in a request message for obtaining the PFD transmitted by the SMF, the PCF provides the corresponding PFD to the SMF according to the location information carried in the request message for obtaining the PFD.

In a step 5a09b, the SMF saves the received information and updates the locally saved Application Id, PFD, and corresponding location area.

In the embodiment, the third-party application interacts with the PCF via the NEF. In other embodiments of the present disclosure, when the third-party application is trusted, for example, the third-party application in the above-mentioned embodiment based on the architecture shown in FIG. 4d, may directly interact with the PCF, and the function of the NEF is done by the PCF.

Embodiment 3

Figure 6:
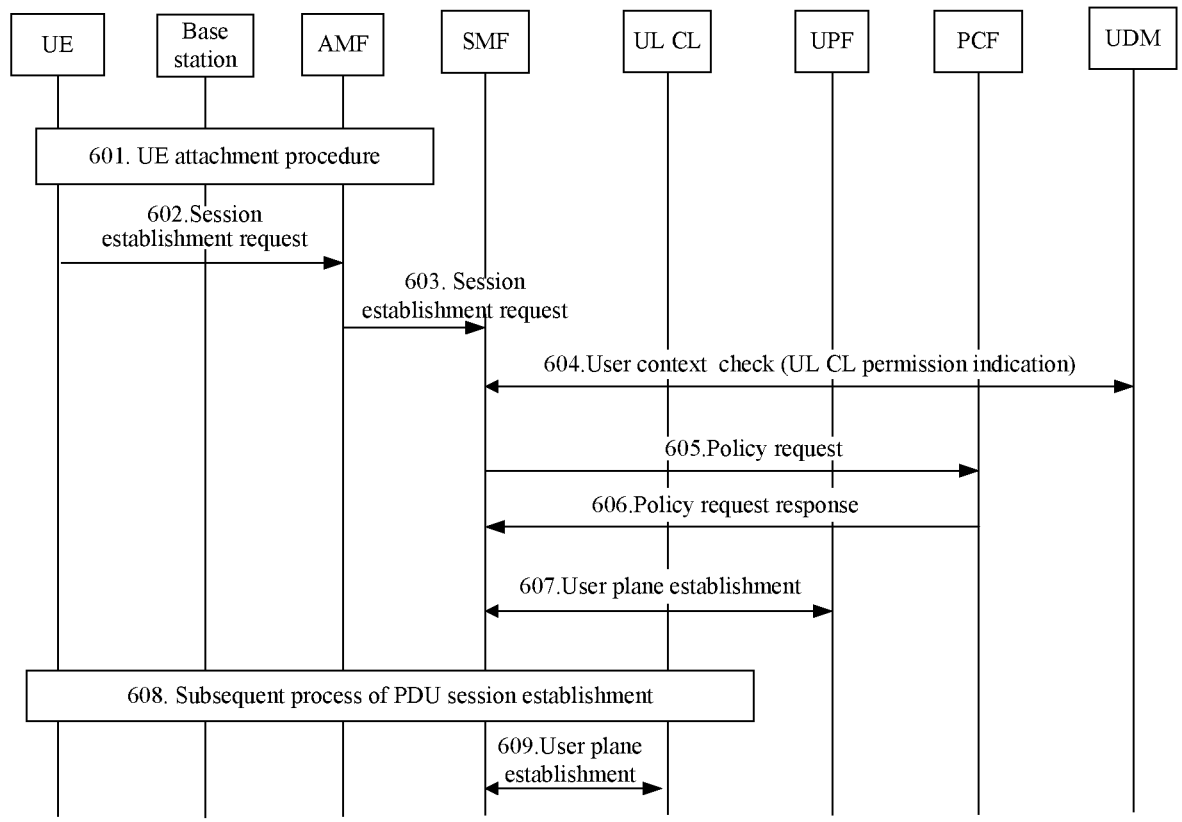
FIG. 6 is a flowchart in which an UL CL has been introduced when a PDU session is established and a splitting rule is activated by a SMF according to an embodiment 3 of the present disclosure.

FIG. 6 is a flowchart of a process in which an UL CL has been introduced when a PDU session is established and a splitting rule is activated by the SMF. As shown in FIG. 6, the process includes steps described below.

In a step 601, a UE initiates an attachment procedure and completes a network registration.

In a step 602, the UE transmits a PDU session establishment request message to an AMF, where the PDU session establishment request message carries a user identifier and a data network name (DN Name).

In a step 603, after selecting a SMF, the AMF forwards the PDU session establishment request message to the selected SMF.

In a step 604, the SMF interacts with user data management (UDM), obtains subscription information of the user, and checks on the UE. The subscription information of the user carries an UL CL permission indication.

In a step 605, the SMF allocates an IP address for the UE. The SMF transmits a policy request message to a PCF, where the policy request message carries a user identifier, the DN Name, and the IP address.

In a step 606, the PCF returns a policy request response message to the SMF, and the policy request response message carries a corresponding policy.

In a step 607, the subscription information obtained in the step 604 includes the UL CL permission indication, so the SMF decides to insert the UL CL in the PDU session. The SMF selects a UPF close to the base station which the UE accesses as the UL CL. The SMF selects a UPF for the PDU session as an anchor UPF. The SMF transmits a user plane establishment request message to the anchor UPF, where the user plane establishment request message carries a PDR, a policy provided by the PCF, and the like. The PDR includes a PDR that instructs the anchor UPF to transmit downlink data to the UL CL. The anchor UPF returns a confirmation message to the SMF. In a step 608, the SMF, the AMF, the base station, and the UE interact with each other to complete the PDU session establishment. Optionally, the interacting process is as follows.

The SMF transmits a PDU session establishment response message to the AMF, where the message carries QoS information, tunnel information for the UL CL to receive uplink data, an IP address, and the like.

The AMF transmits an initial context establishment message to the base station, where the message carries the QoS information, the tunnel information for the UL CL to receive the uplink data, and the like.

The base station transmits a radio resource control (RRC) connection configuration message to the UE.

The UE returns a confirmation message to the base station.

The base station returns an initial context establishment message to the AMF, where the message carries tunnel information for the base station to receive the downlink data.

The UE transmits a PDU session establishment complete message to the AMF.

The AMF transmits a PDU session modifying message to the SMF, where the PDU session modifying message carries the tunnel information for the base station to receive the downlink data.

In a step 609, the SMF transmits a user plane establishment request message to the selected UL CL. The user plane establishment request message carries an UL CL indication and a PDR. The PDR includes a PDR, according to which, data without splitting from the base station is forwarded to the anchor UPF, and data from the anchor UPF is forwarded to the base station. The UL CL activates all PDRs locally configured for traffic splitting according to the UL CL indication. The UL CL returns a confirmation message to the SMF.

Through the above process, a user plane tunnel is established between the base station, the UL CL, and the anchor UPF, and a PDR for splitting is activated on the UL CL. The PDR includes the Application Ids of the applications that need to be offloaded, and the PFDs corresponding to the Application Ids may be dynamically added and updated through the process of FIG. 5 or FIG. 5a. Once service data corresponding to the Application Id is detected by the UL CL according to the PDR, the service data is allocated by the UL CL to a local data network and is not forwarded to the anchor UPF.

In the embodiment, the UL CL may directly offload data to the data network. In other embodiments, the SMF may additionally select an anchor UPF for splitting, and the data to be offloaded is transmitted by the UL CL to the anchor UPF for splitting which in turn offloads the data to the data network.

Embodiment 4

Figure 7:
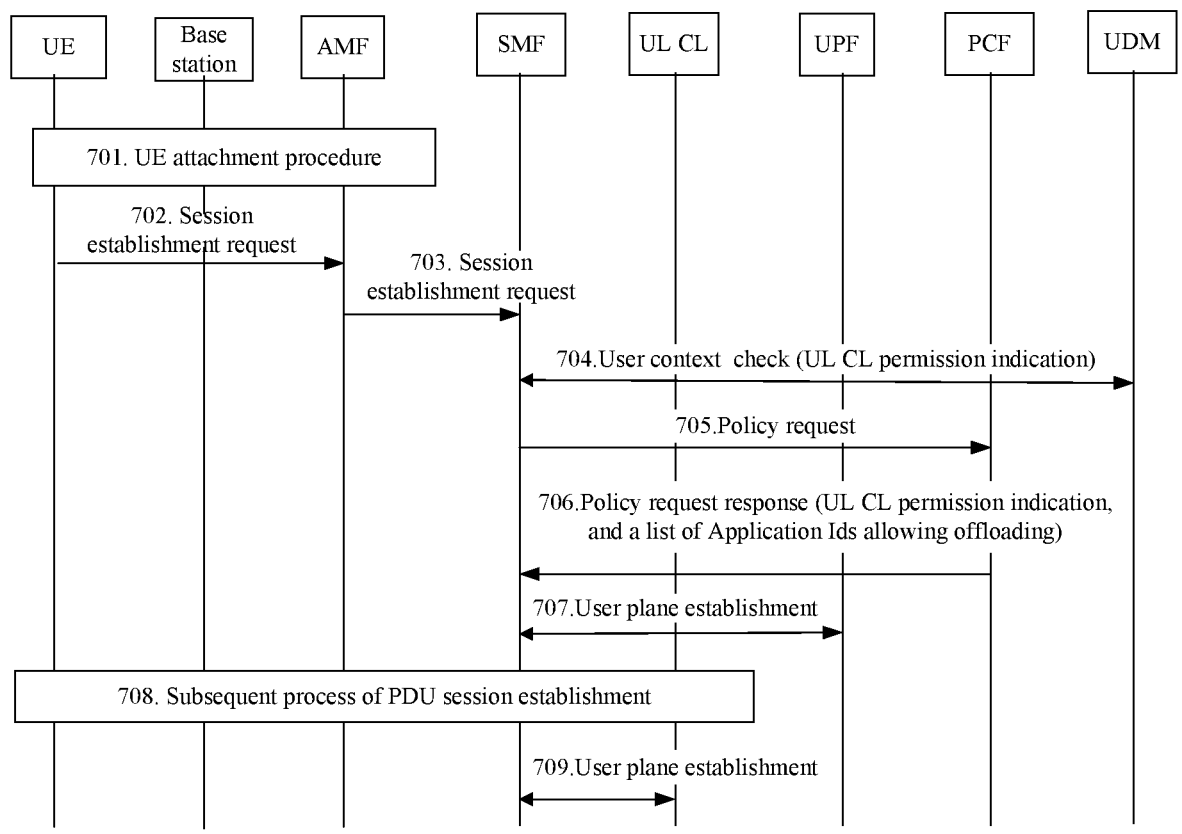
FIG. 7 is a flowchart in which an UL CL is introduced when a PDU session is established and a splitting rule is activated by a PCF according to an embodiment 4 of the present disclosure.

FIG. 7 is a flowchart of a process in which when a PDU session is established, an UL CL has been introduced and a splitting rule has been activated by a PCF. As shown in FIG. 7, the process includes the steps described below.

In a step 701, a UE initiates an attachment procedure and completes a network registration.

In a step 702, the UE transmits a PDU session establishment request message to an AMF, where the PDU session establishment request message carries a user identifier and a DN Name.

In a step 703, after selecting a SMF, the AMF forwards the PDU session establishment request message to the SMF.

In a step 704, the SMF interacts with UDM, obtains subscription information of the user, and checks the UE.

In a step 705, the SMF allocates an IP address for the UE. The SMF transmits a policy request message to a PCF, where the policy request message carries a user identifier, the DN Name, and the IP address.

In a step 706, the PCF returns a policy request response message to the SMF, where the policy request response message carries a corresponding policy. The policy includes an UL CL permission indication, a list of Application Ids allowing splitting, QoS information and splitting policies of these Application Ids, and the like. The policy further includes a policy executed by the anchor UPF.

In a step 707, the SMF decides to insert a UL CL in the PDU session according to the UL CL permission indication returned by the PCF. The SMF selects a UPF close to the base station accessed by the UE as the UL CL. The SMF selects a UPF for the PDU session as an anchor UPF. The SMF transmits a user plane establishment request message to the anchor UPF. The user plane establishment request message carries a PDR, which includes a PDR according to which downlink data is transmitted to the UL CL, a policy provided by the PCF, and the like. The anchor UPF returns a confirmation message to the SMF.

In a step 708, the SMF, the AMF, the base station, and the UE interact with each other to complete the PDU session establishment. Optionally, the interacting process is as follows.

The SMF transmits a PDU session establishment response message to the AMF, where the message carries QoS information, tunnel information for the UL CL to receive uplink data, an IP address, and the like.

The AMF transmits an initial context establishment message to the base station, where the initial context establishment message carries the QoS information, the tunnel information for the UL CL to receive the uplink data, and the like.

The base station transmits a RRC connection configuration message to the UE.

The UE returns a confirmation message to the base station.

The base station returns an initial context establishment message to the AMF, where the initial context establishment message carries tunnel information for the base station to receive the downlink data.

The UE transmits a PDU session establishment complete message to the AMF.

The AMF transmits a PDU session modifying message to the SMF, where the PDU session modifying message carries the tunnel information for the base station to receive the downlink data.

In a step 709, the SMF transmits a user plane establishment request message to the selected UL CL. The user plane establishment request message carries a PDR, which includes a PDR used for splitting an application allowing splitting and a PDR used for forwarding an application not allowing splitting between the base station and the anchor UPF. The PDR for splitting carries the Application Id allowing splitting. The UL CL returns a confirmation message to the SMF.

Through the above process, a user plane tunnel is established between the base station, the UL CL, and the anchor UPF, and a PDR for splitting a specific application is activated on the UL CL. The PDR includes the Application Ids of the applications that need to be offloaded, and the PFDs corresponding to the Application Ids may be dynamically added and updated through the process of FIG. 5 or FIG. 5a. Once service data corresponding to the Application Id is detected by the UL CL according to the PDR, the service data is allocated by the UL CL to a local data network and is not forwarded to the anchor UPF.

In the embodiment, the UL CL may directly offload data to the data network. In other embodiments, the SMF may additionally select an anchor UPF for splitting, and the data to be offloaded is transmitted by the UL CL to the anchor UPF for splitting which in turn offloads the data to the data network.

Embodiment 5

Figure 8:
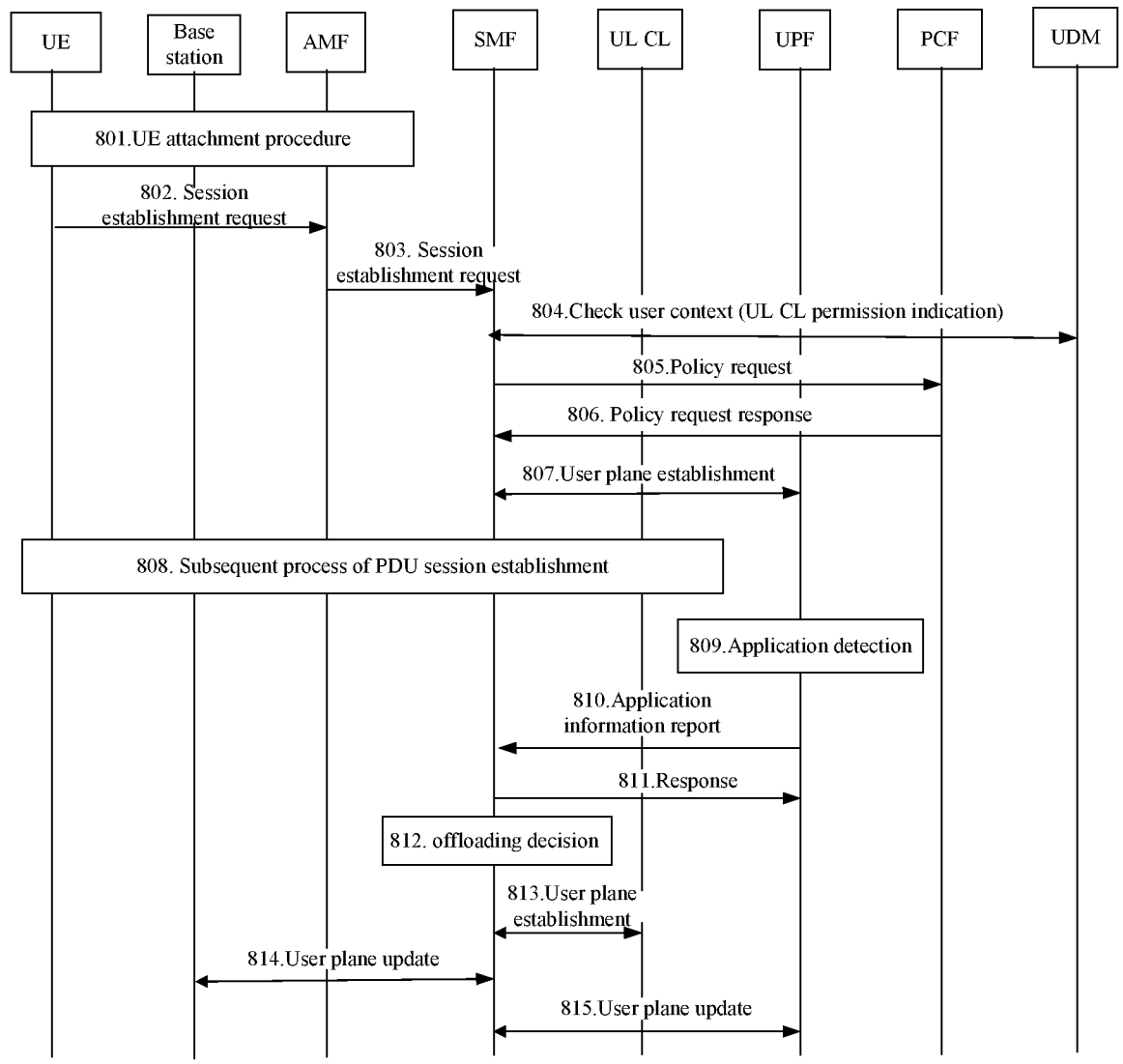
FIG. 8 is a flowchart in which an UL CL is not introduced when a PDU session is established and is introduced when a corresponding application is detected, and a splitting rule is activated by a SMF according to an embodiment 5 of the present disclosure.

FIG. 8 is a flowchart of a process in which an UL CL is not introduced when a PDU session is established and is introduced when a corresponding application is detected, and a splitting rule is activated by a SMF. As shown in FIG. 8, the process includes steps described below.

In a step 801, a UE initiates an attachment procedure and completes a network registration.

In a step 802, the UE transmits a PDU session establishment request message to an AMF, where the PDU session establishment request message carries a user identifier and a DN Name.

In a step 803, after selecting a SMF, the AMF forwards the PDU session establishment request message to the SMF.

In a step 804, the SMF interacts with UDM, obtains subscription information of the user, and checks the UE. The subscription information of the user carries an UL CL permission indication.

In a step 805, the SMF allocates an IP address for the UE. The SMF transmits a policy request message to a PCF, where the policy request message carries a user identifier, the DN Name, and the IP address.

In a step 806, the PCF returns a confirmation message to the SMF, where the confirmation message carries a corresponding policy.

In a step 807, the SMF selects a UPF for the PDU session as an anchor UPF. The SMF transmits a user plane establishment request message to the anchor UPF, where the user plane establishment request message carries a policy provided by the PCF, and the like. Since the UL CL permission indication is received in the step 804, the user plane establishment request message transmitted by the SMF further carries a PDR. The PDR includes the Application Ids of the applications allowing splitting. The PDR instructs the anchor UPF to, when detecting the corresponding application (i.e., the applications indicated by the Application Ids), report the detected application information to the SMF. The anchor UPF returns a confirmation message to the SMF.

In a step 808, the SMF, the AMF, the base station, and the UE interact with each other to complete the PDU session establishment. Optionally, the process is as follows.

The SMF transmits a PDU session establishment response message to the AMF, where the PDU session establishment response message carries QoS information, tunnel information for the anchor UPF to receive uplink data, an IP address, and the like.

The AMF transmits an initial context establishment message to the base station, where the initial context establishment message carries the QoS information, the tunnel information for the anchor UPF to receive the uplink data, and the like.

The base station transmits a RRC connection configuration message to the UE.

The UE returns a confirmation message to the base station.

The base station returns an initial context establishment message to the AMF, where the initial context establishment message carries tunnel information for the base station to receive the downlink data.

The UE transmits a PDU session establishment complete message to the AMF.

The AMF transmits a PDU session modifying message to the SMF, where the PDU session modifying message carries the tunnel information for the base station to receive the downlink data. The SMF transmits a user plane update message to the anchor UPF. The user plane update message carries a PDR, which is used to forward the downlink data to the base station. The anchor UPF returns a confirmation message to the SMF.

In a step 809, the UE accesses an application. The anchor UPF detects that the application is an application allowing splitting according to the installed or activated PDR.

In a step 810, the anchor UPF transmits an application information report message to the SMF, where the application information report message carries the Application Id and service flow description information. The service flow description information includes an IP 5-tuple or an IP 3-tuple of the application. The IP 5-tuple or 3-tuple includes an address of an application server serving the UE.

In a step 811, the SMF returns a response message to the anchor UPF.

In a step 812, according to the current location area of the UE, the location area of the anchor UPF, and the reported service flow description information, the SMF determines that the current anchor UPF is not optimal (that is, the SMF determines that traffic splitting is needed), and the SMF decides to offload the application.

Of course, the decision that the application is offloaded may be directly made without a judgment.

In a step 813, the SMF selects a proper UPF as the UL CL, and transmits a user plane establishment request message to the UL CL. The PDR carried in the user plane establishment request message includes a PDR allowing forwarding uplink data and downlink data between the base station and the anchor UPF. In addition, the SMF also transmits a PDR to the UL CL, where the PDR is used for splitting the data corresponding to the detected Application Id (that is, the packet detection information in the PDR includes the Application Id). The PFD carried in the service data flow (SDF) filter domain of the PDR is address information of an application server that can be accessed nearby via the UL CL, and the address information is different from the server address information reported by the anchor UPF. The SMF may also simultaneously deliver a PDR for instructing the UL CL to offload other applications. The UL CL returns a confirmation message to the SMF.

In a step 814, the SMF transmits a user plane update message to the base station via the AMF, where the user plane update message carries tunnel information for the UL CL to receive the uplink data. The base station returns a confirmation message to the SMF.

In a step 815, the SMF transmits a user plane update message to the anchor UPF, where the user plane update message carries a PDR which is used for instructing the anchor UPF to forward the downlink data to the UL CL. The anchor UPF returns a confirmation message to the SMF.

Through the above-mentioned process, a user plane tunnel is established between the base station, the UL CL, and the anchor UPF, and the PDR for splitting is activated on the UL CL. The PDR includes the Application Id of the application that needs to be offloaded. The UE and the application perform a reselection process, and the UE interacts with an application server close to the UL CL to perform application access.

In the embodiment, the UL CL may directly offload data to the data network. In other embodiments, the SMF may additionally select an anchor UPF for splitting, and the data to be user plane update message is transmitted by the UL CL to the anchor UPF for splitting, which in turn offloads the data to the data network.

Embodiment 6

Figure 9:
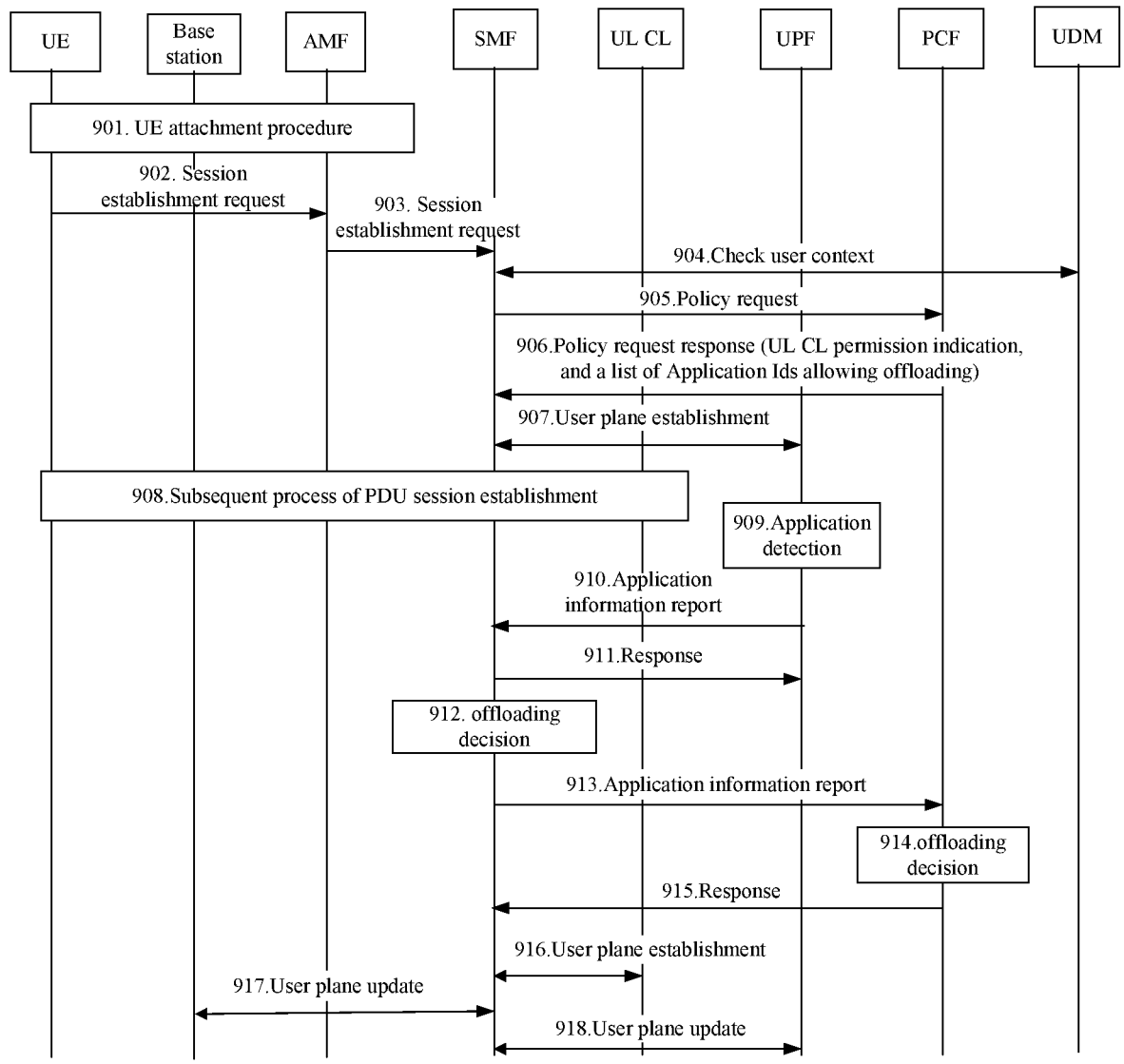
FIG. 9 is a flowchart in which an UL CL is not introduced when a PDU session is established and is introduced when a corresponding application is detected, and a splitting rule is activated by a PCF according to an embodiment 6 of the present disclosure.

FIG. 9 is a flowchart of a process in which an UL CL is not introduced when a PDU session is established and is introduced when a corresponding application is detected, and a splitting rule is activated by a PCF. As shown in FIG. 9, the process includes the steps described below.

In a step 901, a UE initiates an attachment procedure and completes a network registration.

In a step 902, the UE transmits a PDU session establishment request message to an AMF, where the PDU session establishment request message carries a user identifier and a DN Name.

In a step 903, after selecting a SMF, the AMF forwards the PDU session establishment request message to the SMF. In addition, the AMF provides current location information of the UE to the SMF.

In a step 904, the SMF interacts with UDM, obtains subscription information of the user, and checks the UE.

In a step 905, the SMF selects a UPF for the PDU session as an anchor UPF. The SMF allocates an IP address for the UE. The SMF transmits a policy request message to a PCF, where the policy request message carries a user identifier, the DN Name, and the IP address. In addition, the SMF provides the current location information of the UE and the location area of the selected UPF to the PCF.

In a step 906, the PCF returns a confirmation message to the SMF, where the confirmation message carries a corresponding policy which carries an Application Id of the application allowing splitting.

In a step 907, the SMF transmits a user plane establishment request message to the anchor UPF, where the user plane establishment request message carries a policy provided by the PCF, and the like. Since the Application Id of the application allowing splitting is received in the step 906, the message transmitted by SMF further carries PDR. The PDR includes the Application Id of the application allowing splitting, and instructs the anchor UPF to, when detecting the corresponding application (that is, detecting the application allowing splitting), report the detected application information to the SMF. The anchor UPF returns a confirmation message to the SMF.

In a step 908, the SMF, the AMF, the base station, and the UE interact with each other to complete the PDU session establishment. Optionally, the process is described below.

The SMF transmits a PDU session establishment response message to the AMF, where the PDU session establishment response message carries QoS information, tunnel information for the anchor UPF to receive uplink data, an IP address, and the like.

The AMF transmits an initial context establishment message to the base station, where the initial context establishment message carries the QoS information, the tunnel information for the anchor UPF to receive the uplink data, and the like.

The base station transmits a RRC connection configuration message to the UE.

The UE returns a confirmation message to the base station.

The base station returns an initial context establishment message to the AMF, where the initial context establishment message carries tunnel information for the base station to receive the downlink data.

The UE transmits a PDU session establishment complete message to the AMF.

The AMF transmits a PDU session modifying message to the SMF, where the PDU session modifying message carries the tunnel information for the base station to receive the downlink data.

The SMF transmits a user plane update message to the anchor UPF, where the user plane update message carries a PDR which is used for instructing the anchor UPF to forward the downlink data to the base station.

The anchor UPF returns a confirmation message to the SMF.

In a step 909, the UE accesses an application. The anchor UPF detects that the application is an application allowing splitting according to the installed or activated PDR.

In a step 910, the anchor UPF transmits an application information report message to the SMF, where the application information report message carries the Application Id and service flow description information. The service flow description information includes an IP 5-tuple or 3-tuple of the application. The IP 5-tuple or 3-tuple includes an address of an application server that is providing services to the UE.

In a step 911, the SMF returns a confirmation message to the anchor UPF.

In a step 912, optionally, according to the current location area of the UE, the location area of the anchor UPF, the reported service flow description information (the reported service flow description information includes server address information of a third-party application), the saved application identifier, and the corresponding relationship between PFD and location information, the SMF determines that the current anchor UPF is not optimal (that is, a decision is made that traffic splitting is needed) and decides to offload the application. A step 916 is performed.

In a step 913, optionally, if the PCF provides the PFD to the SMF (as shown in FIG. 5*a*), the SMF further transmits the reported application detected information to the PCF.

In a step 914, according to the current location area of the UE, the location area of the anchor UPF, the reported service flow description information (the reported service flow description information includes the server address information of the third-party application), the saved application identifier, and the corresponding relationship between PFD and location information, the PCF determines that the current anchor UPF is not optimal (that is, a decision is made that traffic splitting is needed) and decides to offload the application.

In a step 915, the PCF returns a response message to the SMF, where the response message carries a splitting policy which includes location area information of the new UPF, that is, location information of the UL CL to be selected by the SMF.

In a step 916, the SMF selects a proper UPF as the UL CL (if the splitting decision is made by the PCF, as in steps 913 to 915, the SMF selects the UPF based on location area information of the UPF provided by the PCF) and transmits a user plane establishment request message to the selected UL CL. The user plane establishment request message carries a PDR which includes a PDR according to which uplink data and downlink data that do not need to be offloaded are forwarded between the anchor UPF and the base station. In addition, the SMF further transmits the PDR to the UL CL to instruct the UL CL to offload data corresponding to the detected Application Id. The PFD carried in a SDF filter domain of the PDR is address information of an application server that can be accessed nearby via the UL CL, and is different from the server address information reported by the anchor UPF. The SMF may also deliver a PDR at the same time for instructing the UL CL to offload other applications. The UL CL returns a confirmation message to the SMF.

In a step 917, the SMF transmits a user plane update message to the base station via the AMF, where the user plane update message carries tunnel information for the UL CL to receive the uplink data. The base station returns a confirmation message to the SMF via the AMF.

In a step 918, the SMF transmits a user plane update message to the anchor UPF, where the user plane update message carries a PDR which is used to instruct the anchor UPF to forward the downlink data to the UL CL. The anchor UPF returns a confirmation message to the SMF.

Through the above-mentioned process, a user plane tunnel is established between the base station, the UL CL, and the anchor UPF, and the PDR for splitting is activated on the UL CL and includes the Application Id of the application that needs to be offloaded. The UE and the application perform a reselection process, and the UE interacts with an application server close to the UL CL to perform application access.

In the embodiment, the UL CL may directly offload data to the data network. In other embodiments, the SMF may additionally select an anchor UPF for splitting, and the data to be offloaded is transmitted by the UL CL to the anchor UPF for splitting, and then the anchor UPF offloads the data to the data network.

Figure 10:
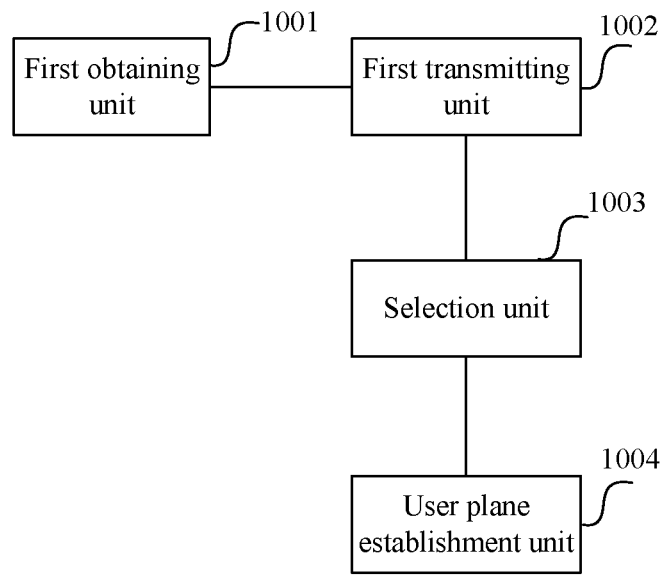
FIG. 10 is a block diagram of an apparatus for implementing traffic splitting according to an embodiment of the present disclosure.

One embodiment of the present disclosure provides an apparatus for implementing traffic splitting. As shown in FIG. 10, the apparatus includes a first obtaining unit 1001 and a first transmitting unit 1002.

The first obtaining unit 1001 is configured to obtain an application identifier, a packet flow description corresponding to the application identifier and location information applicable to the packet flow description from an application.

The first transmitting unit 1002 is configured to provide the packet flow description to a user plane function corresponding to the location information applicable to the packet flow description, so that the user plane function splits traffic data corresponding to the application identifier.

In an alternative embodiment of the present disclosure, the step in which the first obtaining unit 1001 obtains the application identifier, the packet flow description corresponding to the application identifier and the location information applicable to the packet flow description from the application includes the steps described below.

The first obtaining unit 1001 maps an external application identifier provided by the application to the application identifier.

And/or when the location information applicable to the packet flow description is geographic location information, the first obtaining unit 1001 maps the geographic location information to third generation partnership project location information.

In an alternative embodiment of the present disclosure, the apparatus for implementing traffic splitting further includes: a selection unit 1003 and a user plane establishment unit 1004.

The selection unit 1003 is configured to select one user plane function as an uplink classifier.

The user plane establishment unit 1004 is configured to transmit an uplink classifier indication or a packet detection rule to the uplink classifier, where the packet detection rule includes a packet detection rule carrying the application identifier.

In an alternative embodiment of the present disclosure, the step in which the selection unit 1003 selects one user plane function as the uplink classifier includes the steps described below.

In a process of establishing a PDU session for a user equipment, after obtaining an uplink classifier permission indication, the selection unit 1003 selects one user plane function as the uplink classifier.

In an alternative embodiment of the present disclosure, the selection unit 1003 obtains the uplink classifier permission indication in the following manners.

The selection unit 1003 obtains the uplink classifier permission indication from subscription information of the user equipment, or obtains the uplink classifier permission indication from a policy transmitted by the policy function.

In an alternative embodiment of the present disclosure, the selection unit 1003 selects one user plane function as the uplink classifier in the following manners.

After receiving application detected information that is transmitted by an anchor user plane function and indicates that an application allowing splitting is detected, the selection unit 1003 selects one user plane function as the uplink classifier when it is determined that traffic splitting is required.

Or,

After receiving the application detected information that is transmitted by the anchor user plane function and indicates that an application allowing splitting is detected, the selection unit 1003 transmits the application detected information to the policy function. After receiving a splitting policy provided by the policy function, the selection unit 1003 selects one user plane function as the uplink classifier according to the splitting policy.

In an alternative embodiment of the present disclosure, the user plane establishment unit 1004 is further configured to obtain an uplink classifier permission indication from subscription information of a user equipment, or receive an application identifier that allows splitting from the policy function, then provide the packet detection rule containing the application identifier to the anchor user plane function, which instructs the anchor user plane function to report the application detected information to the control plane function when the anchor user plane function detects the application indicated by the application identifier.

Figure 11:
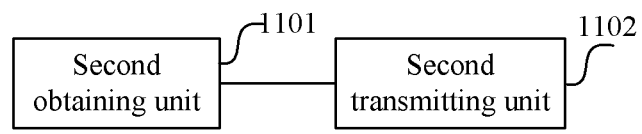
FIG. 11 is a block diagram of an apparatus for implementing traffic splitting according to an embodiment of the present disclosure.

One embodiment of the present disclosure further provides an apparatus for implementing traffic splitting. The apparatus is arranged at a network explore function. As shown in FIG. 11, the apparatus includes a second obtaining unit 1101 and a second transmitting unit 1102.

The second obtaining unit 1101 is configured to obtain an application identifier, a packet flow description corresponding to the application identifier and location information applicable to the packet flow description from an application.

The second transmitting unit 1102 is configured to transmit the application identifier, the packet flow description corresponding to the application identifier and the location information applicable to the packet flow description to a packet filter descriptions function, a session management function or a policy function.

In an alternative embodiment of the present disclosure, the second obtaining unit 1101 obtains the application identifier, the packet flow description corresponding to the application identifier and the location information applicable to the packet flow description from the application is the following manner.

The second obtaining unit 1101 maps an external application identifier provided by the application to the application identifier.

And/or when the location information applicable to the packet flow description is geographic location information, the second obtaining unit 1101 maps the geographic location information to third generation partnership project location information.

In an alternative embodiment of the present disclosure, the second transmitting unit 1102 transmits the application identifier, the packet flow description corresponding to the application identifier and the location information applicable to the packet flow description to the session management function in the following process.

According to the location information applicable to the packet flow description, the second transmitting unit 1102 determines a session management function managing a network location area indicated by the location information applicable to the packet flow description, and transmits the application identifier, the packet flow description corresponding to the application identifier and the location information applicable to the packet flow description to the determined session management function.

Or,

After receiving a request message for obtaining the packet flow description and transmitted by the session management function, the second transmitting unit 1102 transmits the packet flow description corresponding to the application identifier to the session management function according to location information of a user plane function provided by the session management function.

Figure 12:
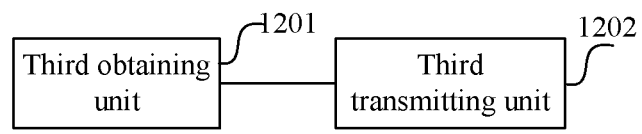
FIG. 12 is a block diagram of an apparatus for implementing traffic splitting according to an embodiment of the present disclosure.

One embodiment of the present disclosure further provides an apparatus for implementing traffic splitting which is arranged at a packet filter descriptions function. As shown in FIG. 12, the apparatus includes a third obtaining unit 1201 and a third transmitting unit 1202.

The third obtaining unit 1201 is configured to obtain an application identifier, a packet flow description corresponding to the application identifier and location information applicable to the packet flow description from a network explore function.

The third transmitting unit 1202 is configured to transmit the application identifier, the packet flow description corresponding to the application identifier and the location information applicable to the packet flow description to a session management function.

In an alternative embodiment of the present disclosure, the third transmitting unit 1202 transmits the application identifier, the packet flow description corresponding to the application identifier and the location information applicable to the packet flow description to the session management function through the following steps.

According to the location information applicable to the packet flow description, the third transmitting unit 1202 determines a session management function managing a network location area indicated by the location information applicable to the packet flow description, and transmits the application identifier, the packet flow description corresponding to the application identifier and the location information applicable to the packet flow description to the determined session management function.

After receiving a request message for obtaining the packet flow description and transmitted by the session management function, the third transmitting unit 1202 transmits the packet flow description corresponding to the application identifier and the location information applicable to the packet flow description to the session management function according to the network location area managed by the session management function.

Or,

After receiving the request message for obtaining the packet flow description and transmitted by the session management function, the third transmitting unit 1202 transmits the packet flow description corresponding to the application identifier to the session management function according to location information of a user plane function provided by the session management function.

Figure 13:
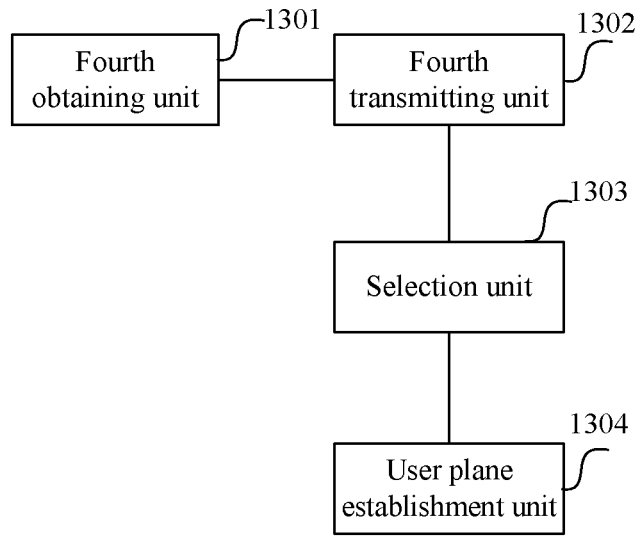
FIG. 13 is a block diagram of an apparatus for implementing traffic splitting according to an embodiment of the present disclosure.

One embodiment of the present disclosure further provides an apparatus for implementing traffic splitting. As shown in FIG. 13, the apparatus includes a fourth obtaining unit 1301 and a fourth transmitting unit 1302.

The fourth obtaining unit 1301 is configured to obtain an application identifier, a packet flow description corresponding to the application identifier and location information applicable to the packet flow description from a network explore function, a packet filter descriptions function or a policy function.

The fourth transmitting unit 1302 is configured to provide the packet flow description to a user plane function corresponding to the location information applicable to the packet flow description, so that the user plane function splits traffic data corresponding to the application identifier.

In an alternative embodiment of the present disclosure, the fourth obtaining unit 1301 obtains the application identifier, the packet flow description corresponding to the application identifier and the location information applicable to the packet flow description from the network explore function, the packet filter descriptions function or the policy function through the following steps.

The fourth obtaining unit 1301 obtains the application identifier, the packet flow description corresponding to the application identifier and the location information applicable to the packet flow description from the network explore function, the packet filter descriptions function or the policy function, when a cache timer of the application identifier saved locally by the session management function expires, or when the session management function needs to install or activate a packet detection rule containing the application identifier and the session management function does not have the packet flow description corresponding to the application identifier, or when the session management function installs or activates the packet detection rule containing the application identifier on the user plane function and the session management function does not have a packet flow description corresponding to a location corresponding to the user plane function.

In an alternative embodiment of the present disclosure, the apparatus for implementing traffic splitting further includes: a selection unit 1303 and a user plane establishment unit 1304.

The selection unit 1303 is configured to select one user plane function as an uplink classifier.

The user plane establishment unit 1304 is configured to transmit an uplink classifier indication or a packet detection rule to the uplink classifier, where the packet detection rule includes a packet detection rule carrying the application identifier.

In an alternative embodiment of the present disclosure, the selection unit 1303 selects one user plane function as the uplink classifier through the following process.

In a process of establishing a PDU session for a user equipment, after obtaining an uplink classifier permission indication, the selection unit 1303 selects one user plane function as the uplink classifier.

In an alternative embodiment of the present disclosure, the selection unit 1303 obtains the uplink classifier permission indication through the following process.

The selection unit 1303 obtains the uplink classifier permission indication from subscription information of the user equipment, or obtains the uplink classifier permission indication from a policy transmitted by the policy function.

In an alternative embodiment of the present disclosure, the selection unit 1303 selects one user plane function as the uplink classifier through the following process.

After receiving application detected information that is transmitted by an anchor user plane function and indicates that an application allowing splitting is detected, the selection unit 1303 selects one user plane function is selected as the uplink classifier when it is determined that traffic splitting is required.

Alternatively, after receiving the application detected information that is transmitted by the anchor user plane function and indicates that an application allowing splitting is detected, the selection unit 1303 transmits the application detected information to the policy function. After receiving a splitting policy provided by the policy function, the selection unit 1303 selects one user plane function as the uplink classifier according to the splitting policy.

In an alternative embodiment of the present disclosure, the user plane establishment unit 1304 is further configured to: obtain an uplink classifier permission indication from subscription information of a user equipment, or receive an application identifier allowing splitting from the policy function, then provide the packet detection rule carrying the application identifier to the anchor user plane function, and instruct the anchor user plane function to report the application detected information to a session management function when the anchor user plane function detects the application.

Figure 14:
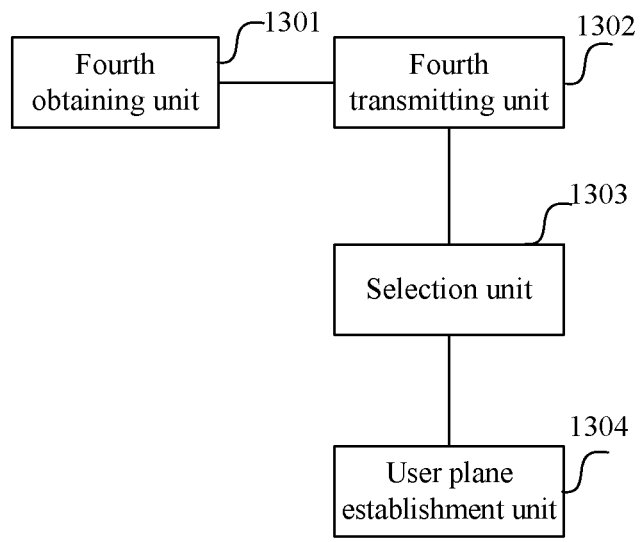
FIG. 14 is a block diagram of an apparatus for implementing traffic splitting according to an embodiment of the present disclosure.

One embodiment of the present disclosure provides an apparatus for implementing traffic splitting. As shown in FIG. 14, the apparatus includes a fifth obtaining unit 1401 and a fifth transmitting unit 1402.

The fifth obtaining unit 1401 is configured to obtain an application identifier, a packet flow description corresponding to the application identifier and location information applicable to the packet flow description from a network explore function or an application.

The fifth transmitting unit 1402 is configured to transmit the application identifier, the packet flow description corresponding to the application identifier and the location information applicable to the packet flow description to a session management function.

In an alternative embodiment of the present disclosure, the fifth transmitting unit 1402 transmits the application identifier, the packet flow description corresponding to the application identifier and the location information applicable to the packet flow description to the session management function through the following steps.

According to the location information applicable to the packet flow description, the transmitting unit 1402 determines a session management function managing a network location area indicated by the location information applicable to the packet flow description, and transmits the application identifier, the packet flow description corresponding to the application identifier and the location information applicable to the packet flow description to the determined session management function.

Or,

After receiving a request message transmitted by the session management function for obtaining the packet flow description, the transmitting unit 1402 transmits, the packet flow description corresponding to the application identifier and the location information applicable to the packet flow description to the session management function according to the network location area managed by the session management function.

Or,

After receiving the request message transmitted by the session management function for obtaining the packet flow description, the transmitting unit 1402 transmits the packet flow description corresponding to the application identifier to the session management function according to location information of a user plane function provided by the session management function.

In an alternative embodiment of the present disclosure, the apparatus for implementing traffic splitting further includes a decision unit 1403.

The decision unit 1403 is configured to, after application detected information that is reported by the session management function and indicates that an application allowing splitting is detected is received, provide, when it is determined that traffic splitting is required, a splitting policy to the session management function, where the splitting policy includes location information of an uplink classifier to be selected.

One embodiment of the present disclosure provides an apparatus for implementing traffic splitting. The apparatus includes a memory and a processor. The memory is configured to store programs. The programs, when fetched and executed by the processor, execute the following operations.

An application identifier, a packet flow description corresponding to the application identifier and location information applicable to the packet flow description are obtained from an application, and then the packet flow description is provided to a user plane function corresponding to the location information applicable to the packet flow description, so that the user plane function splits traffic data corresponding to the application identifier.

One embodiment of the present disclosure provides an apparatus for implementing traffic splitting. The apparatus includes a memory and a processor. The memory is configured to store programs. The programs, when fetched and executed by the processor, execute the following operations.

An application identifier, a packet flow description corresponding to the application identifier and location information applicable to the packet flow description are obtained from an application, and then the application identifier, the packet flow description corresponding to the application identifier and the location information applicable to the packet flow description are transmitted to a packet filter descriptions function, a session management function or a policy function.

One embodiment of the present disclosure provides an apparatus for implementing traffic splitting. The apparatus includes a memory and a processor. The memory is configured to store programs. The programs, when fetched and executed by the processor, execute the following operations.

An application identifier, a packet flow description corresponding to the application identifier and location information applicable to the packet flow description are obtained from a network explore function, and then the application identifier, the packet flow description corresponding to the application identifier and the location information applicable to the packet flow description are transmitted to a session management function.

One embodiment of the present disclosure provides an apparatus for implementing traffic splitting. The apparatus includes a memory and a processor. The memory is configured to store programs. The programs, when fetched and executed by the processor, execute the following operations.

An application identifier, a packet flow description corresponding to the application identifier and location information applicable to the packet flow description are obtained from a network explore function, a packet filter descriptions function or a policy function, and then the packet flow description is provided to a user plane function corresponding to the location information applicable to the packet flow description, so that the user plane function splits traffic data corresponding to the application identifier. In an alternative embodiment of the present disclosure, the programs, when fetched and executed by the processor, further execute the following operations.

One user plane function is selected as an uplink classifier, and an uplink classifier indication or a packet detection rule is transmitted to the uplink classifier. The packet detection rule includes a packet detection rule carrying the application identifier.

One embodiment of the present disclosure provides an apparatus for implementing traffic splitting. The apparatus includes a memory and a processor. The memory is configured to store programs. The programs, when fetched and executed by the processor, execute the following operations.

An application identifier, a packet flow description corresponding to the application identifier and location information applicable to the packet flow description are obtained from a network explore function or an application, and then the application identifier, the packet flow description corresponding to the application identifier and the location information applicable to the packet flow description are transmitted to a session management function.

For technical details of the various apparatuses described above, the method embodiments may be referred to. No further detail will be described herein again.

One embodiment of the present disclosure provides a computer-readable storage medium. The computer-readable storage medium is configured to store one or more programs. The one or more programs may be executed by one or more processors for implementing the above-mentioned method for implementing traffic splitting.

An embodiment of the present disclosure further provides a storage medium. The storage medium is configured to store computer programs which, when being ran, execute the steps of any one of the above-mentioned method embodiments.

Optionally, in this embodiment, the above-mentioned storage medium may include, but is not limited to, a U disk, a read-only memory (ROM), a random access memory (RAM), a mobile hard disk, a magnetic disk, an optical disk or another medium capable of storing computer programs.

An embodiment of the present disclosure further provides an electronic apparatus, including a memory and a processor. The memory is configured to store computer programs and the processor is configured to execute the computer programs for executing the steps in any one of the method embodiments described above.

Optionally, the electronic apparatus described above may further include a transmission device and an input and output device, where both the transmission device and the input and output device are connected to the processor described above.

The serial numbers of the above embodiments of the present disclosure are merely for ease of description and do not indicate superiority and inferiority of the embodiments.

In the above embodiments of the present disclosure, the description of each embodiment has its own emphasis. For a part not described in detail in one embodiment, reference may be made to related description of other embodiments.

It is to be understood that the technical content disclosed in embodiments of the present application may be implemented in other ways. The apparatus embodiments described above are merely exemplary. For example, the unit classification is merely a logical function classification, and, in practice, the unit classification may be implemented in other ways. For example, multiple units or components may be combined or may be integrated into another system, or some features may be omitted or not executed. Additionally, the presented or discussed mutual coupling, direct coupling or communication connection may be indirect coupling or communication connection via interfaces, units or modules, or may be electrical or in other forms.

The units described above as separate components may or may not be physically separated. Components presented as units may or may not be physical units, i.e., may be located in one place or may be distributed over multiple network units. Part or all of these units may be selected according to actual requirements to achieve objects of solutions of embodiments of the present disclosure.

Additionally, various functional units in embodiments of the present disclosure may be integrated into one processing unit, or each unit may be physically present separately, or two or more units may be integrated into one unit. The above-mentioned integrated unit may be implemented by hardware or a software functional unit.

The integrated unit may be stored in a computer-readable storage medium if implemented in the form of a software functional unit and sold or used as an independent product. Based on this understanding, solutions provided by the present disclosure substantially, or the part contributing to the existing art, may be embodied in the form of a software product. The software product is stored on a storage medium and includes several instructions for enabling a computer device (which may be a personal computer, a server, a network device or the like) to execute all or part of steps in the methods provided by embodiments of the present disclosure. The foregoing storage medium includes: a U disk, a read-only memory (ROM), a random access memory (RAM), a mobile hard disk, a magnetic disk, an optical disk or another medium capable of storing program codes.

Although the embodiments disclosed by the present disclosure are as described above, the content thereof is merely embodiments for facilitating the understanding of the present disclosure and is not intended to limit the present disclosure. Any person skilled in the art to which the present disclosure pertains may make any modifications and changes in the forms and details of the implementation without departing from the spirit and range disclosed by the present disclosure, but the patent protection scope of the present disclosure is still subject to the scope defined by the appended claims.

INDUSTRIAL APPLICABILITY

As described above, the method and apparatus for implementing traffic splitting provided by the embodiments of the present disclosure have the following beneficial effects: the packet flow description is installed on the corresponding user plane function by using the location information, and the traffic splitting is implemented. In addition, specific implementation solutions for introducing an UL CL during a PDU session establishment process or after the PDU session establishment are provided. The UL CL is introduced when an UL CL indication exists, or when a specific application is detected.

What is claimed is:

1. A method for implementing traffic splitting, comprising:
   obtaining, by a session management function, a packet flow description message comprising an application identifier, packet flow description, and location information applicable to the packet flow description from a network explore function via a packet filter descriptions function or a policy function;
   providing, by the session management function, the packet flow description to a user plane function corresponding to the location information applicable to the packet flow description to cause the user plane function to split traffic data corresponding to the application identifier.

2. The method of claim 1, wherein obtaining, by the session management function, the packet flow description message comprising the application identifier, the packet flow description, and the location information applicable to the packet flow description from the network explore function via the packet filter descriptions function or the policy function comprises:
   obtaining, by the session management function, the packet flow description message comprising the application identifier, the packet flow description, and the location information applicable to the packet flow description from the network explore function via the packet filter descriptions function or the policy function, when a cache timer of the application identifier saved locally by the session management function expires.

3. The method of claim 1, further comprising: selecting, by the session management function, one user plane function as an uplink classifier, and transmitting an uplink classifier indication or a packet detection rule to the uplink classifier, wherein the packet detection rule comprises a packet detection rule carrying the application identifier.

4. The method of claim 3, wherein selecting, by the session management function, one user plane function as the uplink classifier comprises: in a process of establishing a protocol data unit session for a user equipment by the session management function, selecting one user plane function as the uplink classifier after obtaining an uplink classifier permission indication.

5. The method of claim 4, wherein obtaining, by the session management function, the uplink classifier permission indication comprises:
  obtaining, by the session management function, the uplink classifier permission indication from subscription information of the user equipment.

6. The method of claim 3, wherein selecting, by the session management function, one user plane function as the uplink classifier comprises:
  after receiving, by the session management function, application detected information that is transmitted by an anchor user plane function and indicates that an application allowing splitting is detected, selecting one user plane function as the uplink classifier when it is determined that traffic splitting is required.

7. The method of claim 6, further comprising: after the session management function obtains an uplink classifier permission indication from subscription information of a user equipment, or receives an application identifier allowing splitting from the policy function, providing the packet detection rule carrying the application identifier to the anchor user plane function, and instructing the anchor user plane function to report the application detected information to the session management function when the anchor user plane function detects the application.

8. The method of claim 4, wherein obtaining, by the session management function, the uplink classifier permission indication comprises:
  obtaining, by the session management function, the uplink classifier permission indication from a policy transmitted by the policy function.

9. The method of claim 3, wherein selecting, by the session management function, one user plane function as the uplink classifier comprises:
  receiving, by the session management function, application detected information that is transmitted by an anchor user plane function and indicates that an application allowing splitting is detected, and
  transmitting the application detected information to the policy function, receiving a splitting policy provided by the policy function, and selecting one user plane function as the uplink classifier according to the splitting policy.

10. The method of claim 9, further comprising:
  the session management function obtaining an uplink classifier permission indication from subscription information of a user equipment, or receiving an application identifier allowing splitting from the policy function,
  the session management function providing the packet detection rule carrying the application identifier to the anchor user plane function, and instructing the anchor user plane function to report the application detected information to the session management function when the anchor user plane function detects the application.

11. The method of claim 1, wherein obtaining, by the session management function, the packet flow description message comprising the application identifier, the packet flow description, and the location information applicable to the packet flow description from the network explore function via the packet filter descriptions function or the policy function comprises:
  obtaining, by the session management function, the packet flow description message comprising the application identifier, the packet flow description, and the location information applicable to the packet flow description from the network explore function via the packet filter descriptions function or the policy function, when the session management function needs to install or activate a packet detection rule containing the application identifier and the session management function does not have the packet flow description corresponding to the application identifier.

12. The method of claim 1, wherein obtaining, by the session management function, the packet flow description message comprising the application identifier, the packet flow description, and the location information applicable to the packet flow description from the network explore function via the packet filter descriptions function or the policy function comprises:
  obtaining, by the session management function, the packet flow description message comprising the application identifier, the packet flow description, and the location information applicable to the packet flow description from the network explore function via the packet filter descriptions function or the policy function, when the session management function installs or activates the packet detection rule containing the application identifier on the user plane function and the session management function does not have the packet flow description corresponding to a location corresponding to the user plane function.

13. A session management function entity, comprising:
  a memory; and
  a processor communicably connected with the memory,
  wherein the memory stores instructions executable by the processor, and execution of the instructions by the processor causes the processor to execute a method for implementing traffic splitting,
  wherein the method for implementing traffic splitting, comprising:
  obtaining a packet flow description message comprising an application identifier, packet flow description, and location information applicable to the packet flow description from a network explore function via a packet filter descriptions function or a policy function; and
  providing the packet flow description to a user plane function corresponding to the location information applicable to the packet flow description to cause the user plane function to split traffic data corresponding to the application identifier.

14. The session management function entity of claim 13, wherein
  the processor obtains the packet flow description message comprising the application identifier, the packet flow description, and the location information applicable to the packet flow description from the network explore function via the packet filter descriptions function or the policy function, when a cache timer of the application identifier saved locally by the session management function expires, or
  the processor obtains the packet flow description message comprising the application identifier, the packet flow description, and the location information applicable to the packet flow description from the network explore function via the packet filter descriptions function or the policy function, when the session management function needs to install or activate a packet detection rule containing the application identifier and the session management function does not have the packet flow description corresponding to the application identifier, or the processor obtains the packet flow description message comprising the application identifier, the packet flow description, and the location information applicable to the packet flow description from the network explore function via the packet filter descriptions function or the policy function, when the session management function installs or activates the packet detection rule containing the application identifier on the user plane function and the session management function does not have the packet flow description corresponding to a location corresponding to the user plane function.

15. The session management function entity of claim 13, wherein the method further comprises: selecting one user plane function as an uplink classifier, and transmitting an uplink classifier indication or a packet detection rule to the uplink classifier, wherein the packet detection rule comprises a packet detection rule carrying the application identifier.

16. The session management function entity of claim 15, wherein the step of selecting one user plane function as the uplink classifier comprises: in a process of establishing a protocol data unit session for a user equipment, selecting one user plane function as the uplink classifier after obtaining an uplink classifier permission indication.

17. The session management function entity of claim 16, wherein the step of obtaining, the uplink classifier permission indication comprises:

obtaining the uplink classifier permission indication from subscription information of the user equipment, or obtaining the uplink classifier permission indication from a policy transmitted by the policy function.

18. The session management function entity of claim 15, wherein the step of selecting one user plane function as the uplink classifier comprises:

after receiving application detected information that is transmitted by an anchor user plane function and indicates that an application allowing splitting is detected, and selecting one user plane function as the uplink classifier when it is determined that traffic splitting is required, or, after receiving the application detected information that is transmitted by an anchor user plane function and indicates that an application allowing splitting is detected, transmitting the application detected information to the policy function, receiving a splitting policy provided by the policy function, and selecting one user plane function as the uplink classifier according to the splitting policy.

19. The session management function entity of claim 18, wherein the method further comprises:

obtaining an uplink classifier permission indication from subscription information of a user equipment, or receives an application identifier allowing splitting from the policy function, and providing the packet detection rule carrying the application identifier to the anchor user plane function, and instructing the anchor user plane function to report the application detected information to the session management function entity when the anchor user plane function detects the application.

20. A non-transitory computer-readable storage medium storing executable instructions that, when executed by an electronic device, cause the electronic device to:

obtain a packet flow description message comprising an application identifier, packet flow description, and location information applicable to the packet flow description from a network explore function via a packet filter descriptions function or a policy function; and provide the packet flow description to a user plane function corresponding to the location information applicable to the packet flow description to cause the user plane function to split traffic data corresponding to the application identifier.

21. The non-transitory computer-readable storage medium of claim 20, wherein the electronic device obtains the packet flow description message comprising the application identifier, the packet flow description, and the location information applicable to the packet flow description from the network explore function via the packet filter descriptions function or the policy function, when a cache timer of the application identifier saved locally by the session management function expires, or the electronic device obtains the packet flow description message comprising the application identifier, the packet flow description, and the location information applicable to the packet flow description from the network explore function via the packet filter descriptions function or the policy function, when the session management function needs to install or activate a packet detection rule containing the application identifier and the session management function does not have the packet flow description corresponding to the application identifier, or the electronic device obtains the packet flow description message comprising the application identifier, the packet flow description, and the location information applicable to the packet flow description from the network explore function via the packet filter descriptions function or the policy function, when the session management function installs or activates the packet detection rule containing the application identifier on the user plane function and the session management function does not have the packet flow description corresponding to a location corresponding to the user plane function.

* * * * *